United States Patent
Fujii et al.

(10) Patent No.: US 11,338,592 B2
(45) Date of Patent: May 24, 2022

(54) IMAGE RECORDING METHOD AND IMAGE RECORDING SYSTEM

(71) Applicant: FUJIFILM Corporation, Tokyo (JP)

(72) Inventors: Yusuke Fujii, Kanagawa (JP); Ayato Sato, Kanagawa (JP); Takeshi Miyato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 22 days.

(21) Appl. No.: 17/120,270

(22) Filed: Dec. 14, 2020

(65) Prior Publication Data

US 2021/0094325 A1    Apr. 1, 2021

Related U.S. Application Data

(63) Continuation of application No. PCT/JP2019/023001, filed on Jun. 11, 2019.

(30) Foreign Application Priority Data

Jul. 26, 2018 (JP) .............................. JP2018-140545

(51) Int. Cl.
*B41J 11/00* (2006.01)
(52) U.S. Cl.
CPC ................. *B41J 11/0015* (2013.01)
(58) Field of Classification Search
CPC .................................................. B41J 11/0015
See application file for complete search history.

(56) References Cited

U.S. PATENT DOCUMENTS

| 2002/0192381 | A1 | 12/2002 | Nitzan et al. |
| 2009/0079784 | A1* | 3/2009 | Chiwata ................. C09D 11/54 347/21 |

(Continued)

FOREIGN PATENT DOCUMENTS

| JP | 2010005816 | 1/2010 |
| JP | 2010005996 | 1/2010 |

(Continued)

OTHER PUBLICATIONS

"International Search Report (Form PCT/ISA/210)"of PCT/JP2019/023001, dated Sep. 10, 2019, with English translation thereof, pp. 1-10.

(Continued)

*Primary Examiner* — Justin Seo
(74) *Attorney, Agent, or Firm* — JCIPRNET

(57) ABSTRACT

An image recording method includes determining whether a surface energy of a base material is less than 50 mN/m or greater than 50 mN/m; deciding a condition for drying a pretreatment liquid containing water and an aggregating agent as a condition A in which the mass ratio of the mass of the pretreatment liquid after being dried to the mass of the pretreatment liquid before being dried is 30% or greater and deciding a condition for drying the pretreatment liquid as a condition B in which the mass ratio thereof is less than 50% in a case where the surface energy is determined to be less than 50 mN/m and 50 mN/m or greater, respectively; applying the pretreatment liquid to the base material; drying the applied pretreatment liquid under the drying condition decided; and applying an ink containing water and a colorant to at least a part of the base material.

10 Claims, 5 Drawing Sheets

(56) References Cited

U.S. PATENT DOCUMENTS

| | | | |
|---|---|---|---|
| 2013/0293629 A1 | 11/2013 | Niino et al. | |
| 2014/0043393 A1 | 2/2014 | Takeuchi | |
| 2014/0308447 A1 | 10/2014 | Sarkisian et al. | |
| 2020/0376877 A1* | 12/2020 | Shirokane | B41M 5/0011 |

FOREIGN PATENT DOCUMENTS

| | | |
|---|---|---|
| JP | 2010076316 | 4/2010 |
| JP | 2013248883 | 12/2013 |
| JP | 2015039868 | 3/2015 |
| JP | 2017094673 | 6/2017 |

OTHER PUBLICATIONS

"Written Opinion of the International Searching Authority (Form PCT/ISA/237)" of PCT/JP2019/023001, dated Sep. 10, 2019, with English translation thereof, pp. 1-7.

"Search Report of Europe Counterpart Application", dated Sep. 9, 2021, p. 1-p. 9.

* cited by examiner

2pt

3pt

4pt

5pt

2mm

IMAGE RECORDING METHOD AND IMAGE RECORDING SYSTEM

CROSS-REFERENCE TO RELATED APPLICATIONS

This application is a Continuation of PCT International Application No. PCT/JP2019/023001 filed on Jun. 11, 2019, which claims priority under 35 U.S.C § 119(a) to Japanese Patent Application No. 2018-140545 filed on Jul. 26, 2018. Each of the above application(s) is hereby expressly incorporated by reference, in its entirety, into the present application.

BACKGROUND OF THE INVENTION

1. Field of the Invention

The present disclosure relates to an image recording method and an image recording system.

2. Description of the Related Art

In the related art, various examinations have been performed on inks used for recording images, liquids other than inks which are used for recording images, and image recording methods carried out using inks and other liquids.

JP2010-005816A discloses, as an ink jet recording device that enables high-quality image recording at a high speed by reducing thickness unevenness of an aggregating treatment liquid and reducing cockling of paper due to the aggregating treatment liquid, an ink jet recording device comprising: a treatment liquid applying unit which applies a treatment liquid having a function of aggregating an ink to a recording medium; a first heating condition deciding unit which specifies the amount of a solvent present on a surface of the recording medium to which the treatment liquid has been applied and decides the heating condition for evaporating the solvent present on the surface of the recording medium; a first heating unit which radiantly heats the surface of the recording medium so that the solvent present on the surface of the recording medium is evaporated based on the heating condition decided by the first heating condition deciding unit; a second heating condition deciding unit which decides the heating condition such that the amount of the solvent to permeate into the recording medium is set to be less than or equal to the threshold value of the amount of the solvent, set such that the cockling amount of the recording medium is less than or equal to a predetermined amount, to permeate into the recording medium; a second heating unit which heats the recording medium based on the heating condition decided by the second heating condition deciding unit; and an ink jet head which jets the ink to the recording medium after the heat treatment is performed by the first heating unit and the second heating unit.

Further, JP2010-005816A also discloses, as an image recording method that enables high-quality image recording at a high speed by reducing thickness unevenness of an aggregating treatment liquid and reducing cockling of paper due to the aggregating treatment liquid, an image recording method comprising: a treatment liquid application step of applying a treatment liquid having a function of aggregating an ink to a recording medium; a first heating condition decision step of specifying the amount of a solvent present on a surface of the recording medium to which the treatment liquid has been applied and deciding the heating condition for evaporating the solvent present on the surface of the recording medium; a first heating step of radiantly heating the surface of the recording medium so that the solvent present on the surface of the recording medium is evaporated based on the heating condition decided by the first heating condition decision step; a second heating condition decision step of deciding the heating condition such that the amount of the solvent to permeate into the recording medium is set to be less than or equal to the threshold value of the amount of the solvent, set such that the cockling amount of the recording medium is less than or equal to a predetermined amount, to permeate into the recording medium; a second heating step of heating the recording medium based on the heating condition decided by the second heating condition decision step; and a jetting step of allowing the ink to be jetted to the recording medium after the heat treatment is performed by the first heating step and the second heating step.

SUMMARY OF THE INVENTION

In JP2010-005816A, as described above, for the purpose of reducing cockling of paper as a recording medium, a two-stage heating step in which the first-stage heating is set as radiant heating is provided based on the amount of the solvent present on the surface of the recording medium to which the treatment liquid has been applied, and each heating condition in the two-stage heating step is decided.

However, as a result of examination conducted by the present inventors, it was found that in a case where an impermeable base material (for example, a resin base material) is used as a recording medium in place of paper, a pretreatment liquid containing water and an aggregating agent is applied onto the impermeable base material and dried, and an ink containing water and a colorant is applied to at least a part of the dried surface of the impermeable base material, to which the pretreatment liquid has been applied, to record an image, streak-like defects (hereinafter, also simply referred to as "streaks") or bleeding may occur in the recorded image.

In JP2010-005816A, no consideration is given to the streaks and bleeding of the image occurring in a case of using an impermeable base material (for example, a resin base material) as a recording medium in place of paper.

An object of one aspect of the present disclosure is to provide an image recording method that enables recording of an image, in which occurrence of streaks and bleeding is suppressed, on an impermeable base material.

An object of another aspect of the present disclosure is to provide an image recording system that enables recording of an image, in which occurrence of streaks and bleeding is suppressed, on an impermeable base material.

Specific means for achieving the above-described objects includes the following aspects.

<1> An image recording method comprising: preparing an impermeable base material; preparing a pretreatment liquid containing water and an aggregating agent; preparing an ink containing water and a colorant; determining whether a surface energy of the impermeable base material is less than 50 mN/m or greater than 50 mN/m; deciding a heating and drying condition for heating and drying the pretreatment liquid as a condition A in which a percentage of a mass of the pretreatment liquid after being heated and dried to a mass of the pretreatment liquid before being heated and dried is 30% or greater in a case where the surface energy of the impermeable base material is determined to be less than 50 mN/m and deciding a heating and drying condition for heating and drying the pretreatment liquid as a condition B in which a percentage of a mass of the pretreatment liquid after being heated and dried to a mass of the pretreatment liquid before being heated and dried is less than 50% in a case where the surface energy of the impermeable base material is determined to be 50 mN/m or greater; applying the pretreatment liquid to the impermeable base material; heating and drying the pretreatment liquid applied to the impermeable base material under the heating and drying condition decided in the deciding; and applying the ink to at least a part of a surface of the impermeable base material after the heating and drying, onto which the pretreatment liquid has been applied, to record an image.

<2> The image recording method according to <1>, in which the percentage in the condition A is 40% or greater, and the percentage in the condition B is less than 40%.

<3> The image recording method according to <1> or <2>, in which the percentage in the condition B is 35% or less.

<4> The image recording method according to any one of <1> to <3>, in which the pretreatment liquid contains a resin.

<5> The image recording method according to any one of <1> to <4>, in which a solid content in the pretreatment liquid is 30% by mass or less.

<6> The image recording method according to any one of <1> to <5>, in which the aggregating agent is at least one selected from the group consisting of an organic acid, a polyvalent metal compound, and a metal complex.

<7> The image recording method according to any one of <1> to <6>, in which the impermeable base material is a resin base material having a long sheet shape.

<8> The image recording method according to any one of <1> to <7>, further comprising: measuring the surface energy of the impermeable base material to obtain a measured value, in which in the determining, it is determined whether the surface energy of the impermeable base material is less than 50 mN/m or 50 mN/m or greater based on the measured value.

<9> An image recording system comprising: a pretreatment liquid applying unit which applies a pretreatment liquid to an impermeable base material; a determining unit which determines whether a surface energy of the impermeable base material is less than 50 mN/m or 50 mN/m or greater; a deciding unit which decides a heating and drying condition for heating and drying the pretreatment liquid; a heating and drying unit which heats and dries the pretreatment liquid applied to the impermeable base material under the heating and drying condition decided by the deciding unit; and an ink applying unit which applies the ink to at least a part of a surface of the impermeable base material after the heating and drying, onto which the pretreatment liquid has been applied, to obtain an image, in which the deciding unit decides the heating and drying condition as a condition A in which a percentage of a mass of the pretreatment liquid after being heated and dried to a mass of the pretreatment liquid before being heated and dried is 30% or greater in a case where the surface energy of the impermeable base material is determined to be less than 50 mN/m and decides the heating and drying condition as a condition B in which a percentage of a mass of the pretreatment liquid after being heated and dried to a mass of the pretreatment liquid before being heated and dried is less than 50% in a case where the surface energy of the impermeable base material is determined to be 50 mN/m or greater.

<10> The image recording system according to <9>, in which the percentage in the condition A is 40% or greater, and the percentage in the condition B is less than 40%.

According to one aspect of the present disclosure, it is possible to provide an image recording method that enables recording of an image, in which occurrence of streaks and bleeding is suppressed, on an impermeable base material.

According to another aspect of the present disclosure, it is possible to provide an image recording system that enables recording of an image, in which occurrence of streaks and bleeding is suppressed, on an impermeable base material.

DESCRIPTION OF THE PREFERRED EMBODIMENTS

Figure 1:
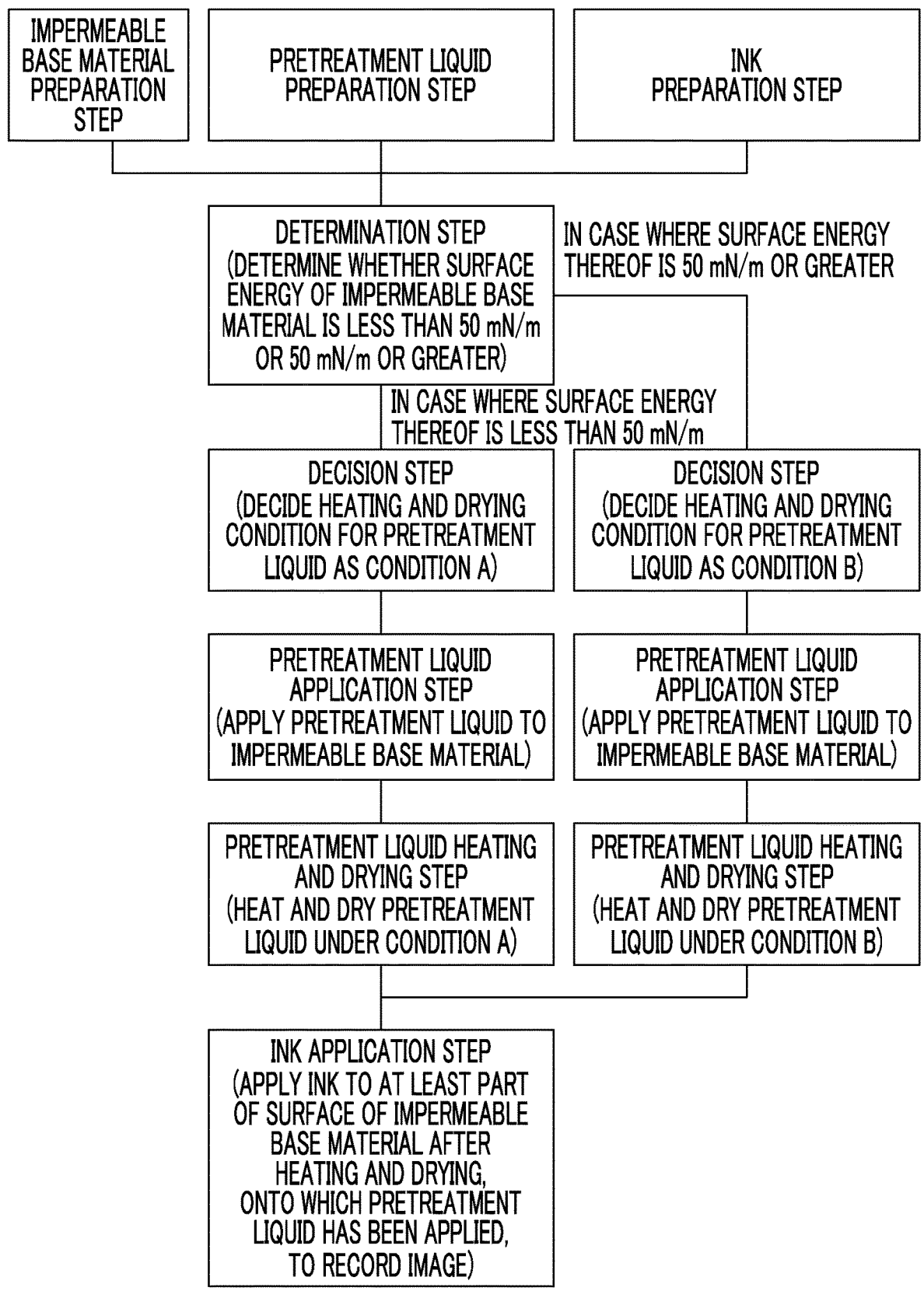
FIG. 1 is a step view showing an example of an image recording method of the present disclosure.

In the present disclosure, a numerical range shown using "to" indicates a range including the numerical values described before and after "to" as a lower limit and an upper limit.

In the present disclosure, in a case where a plurality of substances corresponding to respective components in a composition are present, the amount of the respective components in the composition indicates the total amount of the plurality of substances present in the composition unless otherwise specified.

In a numerical range described in a stepwise manner in the present disclosure, an upper limit or a lower limit described in a certain numerical range may be replaced with an upper limit or a lower limit in another numerical range described in a stepwise manner or may be replaced with a value shown in an example.

In the present disclosure, the meaning of the term "step" includes not only an independent step but also a step whose intended purpose is achieved even in a case where the step is not clearly distinguished from other steps.

In the present disclosure, a combination of preferred embodiments is a more preferred embodiment.

[Image Recording Method]

An image recording method according to the embodiment of the present disclosure, comprises a step of preparing an impermeable base material (hereinafter, also referred to as an "impermeable base material preparation step"); a step of preparing a pretreatment liquid containing water and an aggregating agent (hereinafter, also referred to as a "pretreatment liquid preparation step"); a step of preparing an ink containing water and a colorant (hereinafter, also referred to as an "ink preparation step"); a step of determining whether a surface energy of the impermeable base material is less than 50 mN/m or greater than 50 mN/m (hereinafter, also referred to as a "determination step"); a step of deciding a heating and drying condition for heating and drying the pretreatment liquid as a condition A in which a percentage of a mass of the pretreatment liquid after being heated and dried to a mass of the pretreatment liquid before being heated and dried is 30% or greater in a case where the surface energy of the impermeable base material is determined to be less than 50 mN/m and deciding a heating and drying condition for heating and drying the pretreatment liquid as a condition B in which a percentage of a mass of the pretreatment liquid after being heated and dried to a mass of the pretreatment liquid before being heated and dried is less than 50% in a case where the surface energy of the impermeable base material is determined to be 50 mN/m or greater (hereinafter, also referred to as a "decision step"); a step of applying the pretreatment liquid to the impermeable base material (hereinafter, also referred to as a "pretreatment liquid application step"); a step of heating and drying the pretreatment liquid applied to the impermeable base material under the heating and drying condition set in the decision step (hereinafter, also referred to as a "pretreatment liquid heating and drying step"); and a step of applying the ink to at least a part of the surface of the impermeable base material after the heating and drying, onto which the pretreatment liquid has been applied, to record an image (hereinafter, also referred to as an "ink application step").

In the image recording method according to the embodiment of the present disclosure, an image in which occurrence of streaks and bleeding is suppressed can be recorded on the impermeable base material.

The reason why such an effect is exhibited is assumed as follows. However, the image recording method according to the embodiment of the present disclosure is not limited to the following reason.

The image recording method according to the embodiment of the present disclosure belongs to an image recording method (hereinafter, referred to as a "method X") of applying a pretreatment liquid containing water and an aggregating agent onto an impermeable base material (for example, a resin base material) serving as a recording medium, drying the pretreatment liquid, and applying an ink containing water and a colorant to at least a part of the surface of the impermeable base material after the drying, onto which the pretreatment liquid has been applied, to record an image. According to the method X, an image is obtained by allowing the components in the ink to be aggregated on the impermeable base material using an aggregating agent.

However, as the result of examination conducted by the present inventors, it was found that streaks (that is, streak-like defects) or bleeding may occur in the recorded image in a case where the method X is used.

More specifically, it was found that in a case where the surface energy of the impermeable base material is less than 50 mN/m, the surface energy of the impermeable base material (that is, a surface energy of less than 50 mN/m) affects the surface energy of the surface of the impermeable base material after the drying, onto which the pretreatment liquid has been applied, and as a result, the spread of ink dots due to the ink applied to the surface thereof, onto which the pretreatment liquid has been applied, is insufficient, and thus streaks may occur in the image due to the insufficient spread of the ink dots.

In addition, it was found that in a case where the surface energy of the impermeable base material is 50 mN/m or greater, the surface energy of the impermeable base material (that is, a surface energy of 50 mN/m or greater) affects the surface energy of the surface of the impermeable base material after the drying, onto which the pretreatment liquid has been applied, and as a result, the spread of ink dots due to the ink applied to the surface thereof, onto which the pretreatment liquid has been applied, is extreme, and thus bleeding may occur in the image due to the extreme spread of the ink dots.

In regard to the above-described streaks and bleeding of an image, the heating and drying conditions for heating and drying the pretreatment liquid are decided by the image recording method according to the embodiment of the present disclosure based on the surface energy of the impermeable base material. In this manner, streaks and bleeding of an image are suppressed.

Specifically, in a case where the surface energy of the impermeable base material is less than 50 mN/m, the heating and drying condition for heating and drying the pretreatment liquid is decided as a condition A in which the percentage of the mass of the pretreatment liquid after being heated and dried to the mass of the pretreatment liquid before being heated and dried (hereinafter, also referred to as the mass ratio of the pretreatment liquid [after drying/before drying]) is 30% or greater, in the decision step. In this case, the pretreatment liquid applied to the impermeable base material is heated and dried in the pretreatment liquid heating and drying step under the heating and drying condition (that is, the condition A) decided in the decision step. By heating and drying the pretreatment liquid applied to the impermeable base material under the condition A, water is considered to remain in the pretreatment liquid to some extent even after the pretreatment liquid is heated and dried (in other words, water in the pretreatment liquid is not excessively removed by the heating and drying).

In this manner, in a case where the ink is applied to the surface of the impermeable base material, onto which the pretreatment liquid has been applied, after the pretreatment liquid heating and drying step, the insufficient spread of ink dots is resolved. In this manner, streaks in the image due to the insufficient spread of ink dots are suppressed.

Further, in a case where the surface energy of the impermeable base material is 50 mN/m or greater, the heating and drying condition for heating and drying the pretreatment liquid is decided as a condition B in which the mass ratio of the pretreatment liquid [after drying/before drying]) is less than 50%, in the decision step. In this case, the pretreatment liquid applied to the impermeable base material is heated and dried in the pretreatment liquid heating and drying step under the heating and drying condition (that is, the condition B) decided in the decision step. By heating and drying the pretreatment liquid applied to the impermeable base material under the condition B, water in the treatment liquid is considered to be removed to some extent by the heating and drying. In this manner, in a case where the ink is applied to the surface of the impermeable base material, onto which the pretreatment liquid has been applied, after the pretreatment liquid heating and drying step, the extreme spread of ink dots is resolved. In this manner, bleeding in the image due to the extreme spread of ink dots is suppressed.

In the image recording method according to the embodiment of the present disclosure, it is considered that an image in which occurrence of streaks and bleeding is suppressed can be recorded due to the above-described reasons.

FIG. 1 is a step view showing an example of the image recording method according to the embodiment of the present disclosure.

As shown in FIG. 1, in this example, the impermeable base material preparation step, the pretreatment liquid preparation step, and the ink preparation step are performed. Next, the determination step, the decision step, the pretreatment liquid application step, the pretreatment liquid heating and drying step, and the ink application step are performed in this order.

In FIG. 1, in order to facilitate understanding the features of the image recording method according to the present example, the steps from the decision step to the pretreatment liquid heating step are shown by being divided into two routes. However, the only difference between the two routes is that the heating and drying condition in the decision step and the pretreatment liquid heating and drying step is the condition A or the condition B, and the two routes shown in the figure are substantially one route.

Further, each of the impermeable base material preparation step, the pretreatment liquid preparation step, and the ink preparation step in the example shown in FIG. 1 may be a step of simply preparing the impermeable base material, the pretreatment liquid, or the ink produced in advance in order to provide any of these for the image recording method according as the present example or a step of producing the impermeable base material, the pretreatment liquid, or the ink.

Further, the order of the impermeable base material preparation step, the pretreatment liquid preparation step, and the ink preparation step is not particularly limited.

Further, in this example, the ink preparation step is provided before the determination step, but the image recording method according to the embodiment of the present disclosure is not limited to the embodiment of this example. The ink preparation step may be provided before the ink application step, which is a step of using the ink.

Further, in this example, the pretreatment liquid preparation step is provided before the determination step, but the image recording method according to the embodiment of the present disclosure is not limited to the embodiment of this example. The pretreatment liquid preparation step may be provided before the pretreatment liquid application step of using the pretreatment liquid (preferably before the decision step of deciding the heating and drying conditions for the pretreatment liquid).

Hereinafter, each step of the image recording method according to the embodiment of the present disclosure will be described.

<Impermeable Base Material Preparation Step>

The impermeable base material preparation step is a step of preparing the impermeable base material.

The impermeable base material preparation step may be a step of simply preparing the impermeable base material produced in advance in order to provide the impermeable base material for the image recording method according to the embodiment of the present disclosure or a step of producing the impermeable base material.

In the present disclosure, the "impermeable base material" indicates a base material having a water absorption amount of 0.3 g/m$^2$ or less.

The water absorption amount (g/m$^2$) of the base material is measured as follows.

Water is brought into contact with a region having a size of 100 mm×100 mm in the front surface of the base material (that is, the surface to which the pretreatment liquid is applied), and the state is maintained at 25° C. for 1 minute. The mass (absorption amount (g)) of water absorbed by maintaining the state for 1 minute is acquired, and the obtained absorption amount (g) is converted to the absorption amount per unit area (g/m$^2$).

The impermeable base material is not particularly limited, but a resin base material is preferable.

The resin base material is not particularly limited, and examples thereof include a base material formed of a thermoplastic resin.

A base material obtained by molding a thermoplastic resin in the form of a sheet is exemplified as the resin base material.

It is preferable that the resin base material contains polypropylene, polyethylene terephthalate, nylon, polyethylene, or polyimide.

The resin base material may be a transparent resin base material or a colored resin base material, and at least a part thereof may be subjected to a metal vapor deposition treatment or the like.

Here, the term "transparent" indicates that the transmittance of visible light having a wavelength of 400 nm to 700 nm is 80% or greater (preferably 90% or greater).

The shape of the resin base material is not particularly limited, but a sheet shape is preferable, and a long sheet shape is more preferable.

In a case where the shape of the resin base material is a long sheet, a roll can be formed by performing winding, which is advantageous in terms of productivity in a case of producing the resin base material and speeding up of image recording.

The thickness of the resin base material having a sheet shape is preferably in a range of 10 μm to 200 μm and more preferably in a range of 10 μm to 100 μm.

The impermeable base material to be prepared in the impermeable base material preparation step may be subjected to a surface treatment in advance from the viewpoint of improving the surface energy.

Further, the impermeable base material preparation step may include preparing the impermeable base material and performing a surface treatment on the prepared impermeable base material.

Examples of the surface treatment include a corona treatment, a plasma treatment, a flame treatment, a heat treatment, an abrasion treatment, a light irradiation treatment (UV treatment), and a flame treatment, but the present invention is not limited thereto.

The corona treatment can be performed using Corona Master (PS-OS, manufactured by Shinko Electric & Instrumentation Co., Ltd.) or the like.

As the condition of the corona treatment, for example, the corona treatment may be performed under a condition of a discharge amount (=discharge power/(discharge electrode length×transport speed of impermeable base material)) of 0.5 kW/(m×(m/min)) to 100 kW/(m×(m/min)).

<Pretreatment Liquid Preparation Step>

The pretreatment liquid preparation step is a step of preparing a pretreatment liquid containing water and an aggregating agent.

The pretreatment liquid preparation step may be a step of simply preparing the pretreatment liquid prepared (that is, produced) in advance in order to provide the pretreatment liquid for the image recording method according to the embodiment of the present disclosure or a step of preparing the pretreatment liquid.

(Water)

The pretreatment liquid contains water.

The content of water is preferably 50% by mass or greater and more preferably 60% by mass or greater with respect to the total amount of the pretreatment liquid.

The upper limit of the content of water in the pretreatment liquid varies depending on the content of the aggregating agent and other components that are contained as necessary. The upper limit of the content of water in the pretreatment liquid is, for example, 90% by mass and preferably 80% by mass with respect to the total amount of the pretreatment liquid.

Further, from the viewpoint of more effectively exhibiting the effects of the heating and drying conditions (that is, the condition A and the condition B) for heating and drying the pretreatment liquid, the solid content in the pretreatment liquid is preferably 30% by mass or less, more preferably 25% by mass or less, still more preferably 20% by mass or less, and still more preferably 15% by mass or less.

Here, the solid content in the pretreatment liquid indicates the total amount of the pretreatment liquid excluding the amount of the solvent. The concept of the solvent here includes at least water. In a case where the pretreatment liquid contains a water-soluble solvent, the solvent indicates water and a water-soluble solvent.

(Aggregating Agent)

The pretreatment liquid contains at least one aggregating agent.

The aggregating agent exhibits a function of aggregating the components in the ink on the impermeable base material. In this manner, the rub resistance of an image to be recorded on the impermeable base material is improved.

As the aggregating agent, at least one selected from the group consisting of a polyvalent metal compound, an organic acid, a metal complex, and a water-soluble cationic polymer is preferable.

—Polyvalent Metal Compound—

Examples of the polyvalent metal compound include alkaline earth metals of a group 2 (such as magnesium and calcium) in the periodic table, transition metals of a group 3 (such as lanthanum) in the periodic table, cations of a group 13 (such as aluminum) in the periodic table, and salts of lanthanides (such as neodymium).

As salts of these metals, salts of organic acids, a nitrate, a chloride, and a thiocyanate described below are suitable.

Among these, a calcium salt or magnesium salt of an organic acid (such as formic acid, acetic acid, or a benzoate), a calcium salt or magnesium salt of nitric acid, calcium chloride, magnesium chloride, and a calcium salt or magnesium salt of thiocyanic acid are preferable.

Further, it is preferable that at least a part of the polyvalent metal compound is dissociated into polyvalent metal ions and counter ions in the pretreatment liquid.

—Organic Acid—

As the organic acid, an organic compound containing an acidic group is exemplified.

Examples of the acidic group include a phosphoric acid group, a phosphonic acid group, a phosphinic acid group, a sulfuric acid group, a sulfonic acid group, a sulfinic acid group, and a carboxy group.

From the viewpoint of the aggregation rate of the ink, a phosphoric acid group or a carboxy group is preferable, and a carboxy group is more preferable as the acidic group.

Further, it is preferable that at least a part of the acidic group is dissociated in the pretreatment liquid.

Preferred examples of the organic compound containing a carboxy group include polyacrylic acid, acetic acid, formic acid, benzoic acid, glycolic acid, malonic acid, malic acid (preferably DL-malic acid), maleic acid, succinic acid, glutaric acid, fumaric acid, citric acid, tartaric acid, phthalic acid, 4-methylphthalic acid, lactic acid, pyrrolidone carboxylic acid, pyrrone carboxylic acid, pyrrole carboxylic acid, furan carboxylic acid, pyridine carboxylic acid, coumarinic acid, thiophene carboxylic acid, and nicotinic acid.

These compounds may be used alone or in combination of two or more kinds thereof.

From the viewpoint of the aggregation rate of the ink, as the organic compound containing a carboxy group, di- or higher valent carboxylic acid (hereinafter, also referred to as polyvalent carboxylic acid) is preferable, and dicarboxylic acid is more preferable.

As the dicarboxylic acid, malonic acid, malic acid, maleic acid, succinic acid, glutaric acid, pimelic acid, fumaric acid, tartaric acid, 4-methylphthalic acid, or citric acid is more preferable, and malonic acid, malic acid, glutaric acid, pimelic acid, tartaric acid, or citric acid is still more preferable.

It is preferable that the organic acid has a low pKa (for example, 1.0 to 5.0).

In this manner, the surface charge of particles such as polymer particles or the pigment stably dispersed in the ink by a weakly acidic functional group such as a carboxy group is reduced by bringing the ink into contact with an organic acidic compound having a lower pKa to degrade the dispersion stability.

It is preferable that the organic acid has a low pKa and a high solubility in water and is di- or higher valent and more preferable that the organic acid is a di- or trivalent acidic substance which has a high buffer capacity in a pH region whose pKa is lower than the pKa of the functional group (for example, a carboxy group) that allows the particles to be stably dispersed in the ink.

—Metal Complex—

As the metal complex, a metal complex including at least one selected from the group consisting of zirconium, aluminum, and titanium as a metal element is preferable.

As the metal complex, a metal complex including at least one selected from the group consisting of acetate, acetylacetonate, methylacetoacetate, ethylacetoacetate, octylene glycolate, butoxyacetylacetonate, lactate, lactate ammonium salt, and triethanol aminate as a ligand is preferable.

As the metal complex, various metal complexes are commercially available, and a commercially available metal complex may be used in the present disclosure. Further, various organic ligands, particularly various multidentate ligands that are capable of forming metal chelate catalysts are commercially available. Accordingly, a metal complex prepared by combining a commercially available organic ligand with a metal may be used.

Examples of the metal complex include zirconium tetraacetyl acetonate (for example, "ORGATIX ZC-150", manufactured by Matsumoto Fine Chemical Co., Ltd.), zirconium monoacetyl acetonate (for example, "ORGATIX ZC-540", manufactured by Matsumoto Fine Chemical Co., Ltd.), zirconium bisacetyl acetonate (for example, "ORGATIX ZC-550", manufactured by Matsumoto Fine Chemical Co., Ltd.), zirconium monoethyl acetoacetate (for example, "ORGATIX ZC-560", manufactured by Matsumoto Fine Chemical Co., Ltd.), zirconium acetate (for example, "ORGATIX ZC-115", manufactured by Matsumoto Fine Chemical Co., Ltd.), titanium diisopropoxy bis(acetylacetonate) (for example, "ORGATIX TC-100", manufactured by Matsumoto Fine Chemical Co., Ltd.), titanium tetraacetyl acetonate (for example, "ORGATIX TC-401", manufactured by Matsumoto Fine Chemical Co., Ltd.), titanium dioctyloxy bis(octylene glycolate) (for example, "ORGATIX TC-200", manufactured by Matsumoto Fine Chemical Co., Ltd.), titanium diisopropoxy bis(ethylacetoacetate) (for example, "ORGATIX TC-750", manufactured by Matsumoto Fine Chemical Co., Ltd.), zirconium tetraacetyl acetonate (for example, "ORGATIX ZC-700", manufactured by Matsumoto Fine Chemical Co., Ltd.), zirconium tributoxy monoacetyl acetonate (for example, "ORGATIX ZC-540", manufactured by Matsumoto Fine Chemical Co., Ltd.), zirconium monobutoxy acetyl acetonate bis(ethylacetoacetate) (for example, "ORGATIX ZC-570", manufactured by Matsumoto Fine Chemical Co., Ltd.), zirconium dibutoxy bis(ethylacetoacetate) (for example, "ORGATIX ZC-580", manufactured by Matsumoto Fine Chemical Co., Ltd.), aluminum trisacetyl acetonate (for example, "ORGATIX AL-80", manufactured by Matsumoto Fine Chemical Co., Ltd.), titanium lactate ammonium salt (for example, "ORGATIX TC-300", manufactured by Matsumoto Fine Chemical Co., Ltd.), titanium lactate (for example, "ORGATIX TC-310, 315", manufactured by Matsumoto Fine Chemical Co., Ltd.), titanium triethanol aminate (for example, "ORGATIX TC-400", manufactured by Matsumoto Fine Chemical Co., Ltd.), and a zirconyl chloride compound (for example, "ORGATIX ZC-126", manufactured by Matsumoto Fine Chemical Co., Ltd.). Among these, titanium lactate ammonium salt (for example, "ORGATIX TC-300", manufactured by Matsumoto Fine Chemical Co., Ltd.), titanium lactate (for example, "ORGATIX TC-310, 315", manufactured by Matsumoto Fine Chemical Co., Ltd.), titanium triethanol aminate (for example, "ORGATIX TC-400", manufactured by Matsumoto Fine Chemical Co., Ltd.), and a zirconyl chloride compound (for example, "ORGATIX ZC-126", manufactured by Matsumoto Fine Chemical Co., Ltd.) are preferable.

—Water-Soluble Cationic Polymer—

Examples of the water-soluble cationic polymer include polyallylamine, polyallylamine derivatives, poly-2-hydroxypropyldimethylammonium chloride, and poly(diallyldimethylammoniumchloride).

The water-soluble cationic polymer can refer to the descriptions in known documents such as JP2011-042150A (particularly, paragraph 0156) and JP2007-098610A (particularly, paragraphs 0096 to 0108) as appropriate.

Examples of commercially available products of the water-soluble cationic polymer include SHALLOL (registered trademark) DC-303P and SHALLOL DC-902P (both manufactured by DKS Co., Ltd.), CATIOMASTER (registered trademark) PD-7 and CATIOMASTER PD-30 (both manufactured by Yokkaichi Chemical Co., Ltd.) and UNISENCE FPA100L (manufactured by Senka Corporation).

In the present disclosure, the term "water-soluble" indicates a property in which a substance is dissolved in water at a certain concentration or higher.

In the present disclosure, as the "water-soluble" property, a property in which the amount of a substance to be dissolved in 100 g of water at 25° C. is 5 g or greater (more preferably 10 g or greater) is preferable.

The content of the aggregating agent in the pretreatment liquid is not particularly limited.

From the viewpoint of the aggregation rate of the ink, the content of the aggregating agent is preferably in a range of 0.1% by mass to 30% by mass, more preferably in a range of 1% by mass to 20% by mass, still more preferably in a range of 1% by mass to 10% by mass, and still more preferably in a range of 1% by mass to 8% by mass with respect to the total amount of the pretreatment liquid.

(Resin)

It is preferable that the pretreatment liquid contains at least one resin.

In a case where the pretreatment liquid contains a resin, the adhesiveness of the image to the surface of the impermeable base material, to which the treatment liquid has been applied, is further improved.

Examples of the resin that may be contained in the pretreatment liquid include a polyester resin, a polyurethane resin, an acrylic resin, a polyamide resin, a polyurea resin, a polycarbonate resin, a polyolefin resin, and a polystyrene resin.

The weight-average molecular weight (Mw) of the resin that may be contained in the pretreatment liquid is preferably in a range of 1000 to 300000, more preferably in a range of 2000 to 200000, and still more preferably in a range of 5000 to 100000.

In the present disclosure, the weight-average molecular weight (Mw) indicates a value measured by gel permeation chromatography (GPC) unless otherwise specified.

The measurement according to gel permeation chromatography (GPC) is performed using HLC (registered trademark)-8020GPC (manufactured by Tosoh Corporation) as a measuring device, three columns of TSKgel (registered trademark) Super Multipore HZ-H (manufactured by Tosoh Corporation, 4.6 mmID×15 cm), and tetrahydrofuran (TIF) as an eluent. Further, the measurement is performed under measurement conditions of a sample concentration of 0.45% by mass, a flow rate of 0.35 ml/min, a sample injection volume of 10 µl, and a measurement temperature of 40° C. using an RI detector.

Further, the calibration curve is produced using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

The resin that may be contained in the pretreatment liquid has preferably an alicyclic structure or an aromatic ring structure and more preferably an aromatic ring structure.

As the alicyclic structure, an alicyclic hydrocarbon structure having 5 to 10 carbon atoms is preferable, and a cyclohexane ring structure, a dicyclopentanyl ring structure, a dicyclopentenyl ring structure, or an adamantane ring structure is preferable.

As the aromatic ring structure, a naphthalene ring or a benzene ring is preferable, and a benzene ring is more preferable.

The amount of the alicyclic structure or the aromatic ring structure is not particularly limited, but is, for example, preferably in a range of 0.01 mol to 1.5 mol and more preferably in a range of 0.1 mol to 1 mol per 100 g of the resin.

It is preferable that the resin that may be contained in the pretreatment liquid has an ionic group.

The ionic group may be an anionic group or a cationic group, but an anionic group is preferable from the viewpoint of ease of introduction.

The anionic group is not particularly limited, but a carboxy group or a sulfo group is preferable, and a sulfo group is more preferable.

The amount of the ionic group is not particularly limited, but is preferably in a range of 0.001 mol to 1.0 mol and more preferably in a range of 0.01 mol to 0.5 mol per 100 g of the resin.

As a form of the resin that may be contained in the pretreatment liquid, resin particles are preferable.

In a case where the pretreatment liquid contains resin particles, it is preferable that the resin in the resin particles is a water-insoluble resin.

In the present disclosure, the term "water-insoluble" indicates a property in which the amount of a substance to be dissolved in 100 g of water at 25° C. is less than 1.0 g (more preferably less than 0.5 g).

The volume average particle diameter of the resin particles described above is preferably in a range of 1 nm to 300 nm, more preferably in a range of 3 nm to 200 nm, and still more preferably in a range of 5 nm to 150 nm.

In the present disclosure, the volume average particle diameter indicates a value measured using a laser diffraction scattering type particle size distribution analyzer.

As a measuring device, a particle size distribution measuring device "MICROTRAC MT-3300II" (manufactured by Nikkiso Co., Ltd.) is exemplified.

In the present disclosure, in a case of preparing a pretreatment liquid that contains resin particles, a commercially available product of an aqueous dispersion liquid of resin particles may be used as a raw material.

Specific examples of the aqueous dispersion liquid of resin particles include PESRESIN A124GP, PESRESIN A645GH, PESRESIN A613GE, and PESRESIN A615GE (all manufactured by Takamatsu Oil & Fat Co., Ltd.), Eastek 1100 and Eastek 1200 (both manufactured by Eastman Chemical Company), PLASCOAT RZ570, PLASCOAT Z687, PLASCOAT Z565, PLASCOAT RZ570, and PLASCOAT Z690 (all manufactured by Goo Chemical Co., Ltd.), VYLONAL MD1200 (manufactured by Toyobo Co., Ltd.), and EM57DOC (manufactured by Daicel FineChem Ltd.).

As the resin particles, at least one selected from the group consisting of acrylic resin particles, polyester resin particles, and composite resin particles containing an acrylic resin and a polyester resin is preferable.

Here, the acrylic resin particles indicate particles which contain an acrylic resin but do not contain a polyester resin in each particle. The proportion of the acrylic resin in the acrylic resin particles is preferably 90% by mass or greater.

Further, the polyester resin particles indicate particles which contain a polyester resin but do not contain an acrylic resin in each particle. The proportion of the polyester resin in the polyester resin particles is preferably 90% by mass or greater.

Further, the composite resin particles containing an acrylic resin and a polyester resin indicate particles which contain both an acrylic resin and a polyester resin in each particle. The total proportion of the acrylic resin and the polyester resin in the composite resin particles is preferably 90% by mass or greater.

Specific embodiments of the composite resin particles (that is, particles containing both an acrylic resin and a polyester resin in each particle) are not particularly limited.

Examples of the specific embodiments of the composite particles include an embodiment in which a polymer chain of an acrylic resin and a polymer chain of a polyester resin are entangled with each other.

Examples of the method of producing the composite resin particles include a method of mixing an aqueous dispersion liquid of a polyester resin with an aqueous dispersion liquid of an acrylic resin containing a glycidyl group; a method of polymerizing (homopolymerizing or copolymerizing) at least one kind of radically polymerizable unsaturated monomer containing a glycidyl group in an aqueous dispersion liquid of a polyester resin; and a method of copolymerizing a radically polymerizable unsaturated monomer containing a glycidyl group with another radically polymerizable unsaturated monomer in an aqueous dispersion liquid of a polyester resin.

The method of producing the composite resin particles can refer to known documents such as JP2010-143955A.

Examples of the commercially available products of the aqueous dispersion liquid of the composite resin particles include PESRESIN A613GE and PESRESIN A615GE described above.

In a case where the pretreatment liquid contains resin particles and the ink contains resin particles, the relationship between the glass transition temperature of the resin particles contained in the pretreatment liquid (hereinafter, also referred to as "$T_{gp}$") and the glass transition temperature of the resin particles contained in the ink described below (hereinafter, also referred to as "$T_{gi}$") is not particularly limited, but $T_{gi}-T_{gp}$ is higher than or equal to $-100°$ C., $T_{gi}-T_{gp}$ is preferably higher than $0°$ C. (that is, $T_{gi}<T_{gp}$), $T_{gi}-T_{gp}$ is more preferably higher than or equal to $20°$ C., and $T_{gi}-T_{gp}$ is still more preferably higher than or equal to $30°$ C.

In a case where "$T_{gi}<T_{gp}$" is satisfied, the adhesiveness of the image and the rub resistance of the image are further improved.

The upper limit of $T_{gi}-T_{gp}$ is not particularly limited, but the upper limit thereof is preferably $100°$ C.

Further, from the viewpoint of the manufacturing suitability of the resin particles, $T_g$ is preferably $0°$ C. or higher (that is, "$0°$ C.$<T_{gp}$" is satisfied), more preferably $10°$ C. or higher, still more preferably $20°$ C. or higher, and still more preferably $30°$ C. or higher.

From the viewpoint of improving the adhesiveness of the image, the upper limit of $T_{gp}$ is preferably $150°$ C. and more preferably $100°$ C.

In the present disclosure, the glass transition temperature of the resin particles indicates a value measured using differential scanning calorimetry (DSC).

The specific measurement of the glass transition temperature is performed in conformity with the method described in JIS K 7121 (1987) or JIS K 6240 (2011).

The glass transition temperature in the present disclosure is the extrapolated glass transition start temperature (hereinafter, also referred to as Tig).

The method of measuring the glass transition temperature will be described in more detail.

In a case where the glass transition temperature is acquired, the resin particles are maintained at a temperature lower than the expected glass transition temperature of the resin particles by approximately $50°$ C. until the device is stabilized, the resin particles are heated to a temperature higher than the temperature at which the glass transition is completed by approximately $30°$ C. at a heating rate of $20°$ C./min, and a differential thermal analysis (DTA) curve or a DSC curve is created.

The extrapolated glass transition start temperature (Tig), that is, the glass transition temperature in the present disclosure is acquired as the temperature of the intersection between a straight line obtained by extending the base line on a low temperature side in the DTA curve or the DSC curve onto a high temperature side and a tangent drawn at a point where the gradient of a curve from a step-like change portion of the glass transition is maximized.

Further, in a case where the pretreatment liquid contains two or more kinds of resin particles, the glass transition temperature ($T_{gp}$) of the resin particles contained in the pretreatment liquid indicates the weighted average value of the glass transition temperatures of individual resin particles contained in the pretreatment liquid.

Here, the weighted average value of the glass transition temperatures of individual resin particles contained in the pretreatment liquid can be acquired according to Mathematical Formula 1.

Specifically, in Mathematical Formula 1, the weighted average value of the glass transition temperatures of individual resin particles contained in the pretreatment liquid can be calculated as X in Mathematical Formula 1 by substituting the glass transition temperature of the i-th (i represents an integer of 1 or greater) resin particle contained in the pretreatment liquid for $S_i$ and substituting the mass fraction of the i-th resin particle in the entirety of the resin particles contained in the pretreatment liquid for $W_i$ in Mathematical Formula 1.

$$X = \frac{\sum S_i W_i}{\sum Wi}$$ (Mathematical Formula 1)

Further, in a case where the pretreatment liquid contains resin particles and the ink contains resin particles, the relationship between the volume average particle diameter of the resin particles contained in the pretreatment liquid (hereinafter, also referred to as "$P_p$") and the volume average particle diameter of the resin particles contained in the ink described below (hereinafter, also referred to as "$P_i$") is not particularly limited, but $P_p-P_i$ is, for example, greater than or equal to −120 nm, $P_p-P_i$ is preferably greater than 0 (that is, $P_i<P_p$), $P_p-P_i$ is more preferably greater than or equal to 10 nm, and $P_p-P_i$ is still more preferably greater than or equal to 20 nm.

In a case where "$P_i<P_p$" is satisfied, the adhesiveness of the image and the rub resistance of the image are further improved.

The upper limit of $P_p-P_i$ is not particularly limited, but the upper limit thereof is preferably 100 nm.

In the case where "$P_i<P_p$" is satisfied, from the viewpoint of further improving the adhesiveness of the image and the rub resistance of the image, it is preferable that the relationship of "$T_{gp}<T_{gi}$" is also satisfied.

In this case, more preferred embodiments of the relationship between $P_i$ and $P_p$ and the relationship between $T_{gp}$ and $T_{gi}$ are as described above.

The pretreatment liquid may contain, as a resin, a water-insoluble resin (for example, the resin particles described above) and a water-soluble resin other than the water-soluble cationic polymer.

In the present disclosure, the water-soluble cationic polymer is assumed to be included in the concept of the "aggregating agent" rather than the "resin".

The water-soluble resin other than the water-soluble cationic polymer is not particularly limited, and known water-soluble resins such as polyvinyl alcohol, polyacrylamide, polyvinylpyrrolidone, and polyethylene glycol (those corresponding to the water-soluble cationic polymer are excluded) can be used.

Further, as the water-soluble resin, the water-soluble polymer compounds described in paragraphs 0026 to 0080 of JP2013-001854A (those corresponding to the water-soluble cationic polymer are excluded) are also suitable.

In a case where the pretreatment liquid contains a resin, the content of the resin in the pretreatment liquid is preferably in a range of 1% by mass to 25% by mass, more preferably in a range of 2% by mass to 20% by mass, and still more preferably in a range of 3% by mass to 15% by mass with respect to the total amount of the pretreatment liquid.

(Water-Soluble Solvent)

It is preferable that the pretreatment liquid contains at least one water-soluble solvent.

As the water-soluble solvent, known solvents can be used without particular limitation.

Examples of the water-soluble solvent include polyhydric alcohol such as glycerin, 1,2,6-hexanetriol, trimethylolpropane, alkanediol (for example, ethylene glycol, propylene glycol (1,2-propanediol), 1,3-propanediol, 1,3-butanediol, 1,4-butanediol, 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol), or polyalkylene glycol (for example, diethylene glycol, triethylene glycol, tetraethylene glycol, pentaethylene glycol, dipropylene glycol, or polyoxyethylene polyoxypropylene glycol); polyhydric alcohol ether such as polyalkylene glycol ether (for example, diethylene glycol monoalkyl ether, triethylene glycol monoalkyl ether, tripropylene glycol monoalkyl ether, or polyoxypropylene glyceryl ether); and saccharides, sugar alcohols, hyaluronic acids, alkyl alcohols having 1 to 4 carbon atoms, glycol ethers, 2-pyrrolidone, and N-methyl-2-pyrrolidone described in paragraph 0116 of JP2011-042150A.

Among these, from the viewpoint of suppressing transfer of components, polyhydric alcohol or polyhydric alcohol ether is preferable, and alkanediol, polyalkylene glycol, or polyalkylene glycol ether is more preferable.

In a case where the pretreatment liquid contains a water-soluble solvent, the content of the water-soluble solvent in the pretreatment liquid is preferably in a range of 1% by mass to 25% by mass, more preferably in a range of 2% by mass to 20% by mass, and still more preferably in a range of 3% by mass to 15% by mass with respect to the total amount of the pretreatment liquid.

(Surfactant)

The pretreatment liquid may contain at least one surfactant.

The surfactant can be used as a surface tension adjuster or an antifoaming agent. Examples of the surface tension adjuster or the antifoaming agent include a non-ionic surfactant, a cationic surfactant, an anionic surfactant, and a betaine surfactant. Among these, from the viewpoint of the aggregation rate of the ink, a non-ionic surfactant or an anionic surfactant is preferable.

Examples of the surfactant include compounds exemplified as surfactants in pp. 37 and 38 of JP1984-157636A (JP-S59-157636A) and Research Disclosure No. 308119 (1989). Further, other examples of the surfactant include fluorine-based (fluorinated alkyl) surfactants and silicone-based surfactants described in JP2003-322926A, JP2004-325707A, and JP2004-309806A.

In a case where the pretreatment liquid contains a surfactant, the content of the surfactant in the pretreatment liquid is not particularly limited, but the content thereof can be set such that the surface tension of the pretreatment liquid reaches preferably 50 mN/m or less, more preferably in a range of 20 mN/m to 50 mN/m, and still more preferably in a range of 30 mN/m to 45 mN/m.

For example, in a case where the pretreatment liquid contains a surfactant as an antifoaming agent, the content of the surfactant as an antifoaming agent is preferably in a range of 0.0001% by mass to 1% by mass and more preferably in a range of 0.001% by mass to 0.1% by mass with respect to the total amount of the pretreatment liquid.

(Other Components)

The pretreatment liquid may contain other components in addition to the above-described components as necessary.

Examples of other components that may be contained in the pretreatment liquid include known additives such as a solid wetting agent, colloidal silica, an inorganic salt, a fading inhibitor, an emulsion stabilizer, a penetration enhancer, an ultraviolet absorbing agent, a preservative, an antibacterial agent, a pH adjuster, a viscosity adjuster, a rust inhibitor, a chelating agent, and a water-soluble polymer compound other than the water-soluble cationic polymer (for example, water-soluble polymer compounds described in paragraphs 0026 to 0080 of JP2013-001854A).

The preparation method for preparing (producing) the pretreatment liquid is not particularly limited, and a known method of mixing respective components of a pretreatment liquid can be used.

(Physical Properties of Pretreatment Liquid)

From the viewpoint of the aggregation rate of the ink, the pH of the pretreatment liquid at 25° C. is preferably in a range of 0.1 to 3.5.

In a case where the pH of the pretreatment liquid is 0.1 or greater, the roughness of the impermeable base material is further reduced and the adhesiveness of the image area is further improved.

In a case where the pH of the pretreatment liquid is 3.5 or less, the aggregation rate is further improved, coalescence of dots (ink dots) caused by the ink on the impermeable base material is further suppressed, and the roughness of the image is further reduced.

The pH (25° C.) of the pretreatment liquid is more preferably in a range of 0.2 to 2.0.

From the viewpoint of the aggregation rate of the ink, the viscosity of the pretreatment liquid is preferably in a range of 0.5 mPa s to 10 mPa s and more preferably in a range of 1 mPa s to 5 mPa s. The viscosity is a value measured using a VISCOMETER TV-22 (manufactured by TOKI SANGYO CO., LTD.) under a temperature condition of 25° C.

The surface tension of the pretreatment liquid at 25° C. is preferably 60 mN/m or less, more preferably in a range of 20 mN/m to 50 mN/m, and still more preferably in a range of 30 mN/m to 45 mN/m. In a case where the surface tension of the pretreatment liquid is in the above-described range, the adhesiveness between the impermeable base material and the pretreatment liquid is improved. The surface tension of the pretreatment liquid is measured using an Automatic Surface Tensiometer CBVP-Z (manufactured by Kyowa Interface Science Co., Ltd.) according to a plate method.

<Ink Preparation Step>

The ink preparation step is a step of preparing an ink containing water and a colorant.

The ink preparation step may be a step of simply preparing the ink prepared (that is, produced) in advance in order to provide the ink for the image recording method according to the embodiment of the present disclosure or a step of preparing the ink.

Further, in the ink preparation step, only one kind of ink may be prepared, or two or more kinds of inks may be prepared. In a case where two or more colors of inks are prepared in the ink preparation step, image recording using two or more colors of inks can be performed.

(Water)

The ink contains water.

The content of water is preferably 50% by mass or greater and more preferably 60% by mass or greater with respect to the total amount of the ink.

The upper limit of the content of water in the ink varies depending on the content of the colorant and other components that are contained as necessary. The upper limit of the content of water in the ink is, for example, 90% by mass and preferably 80% by mass with respect to the total amount of the ink.

(Colorant)

The ink contains at least one colorant.

The colorant is not particularly limited and known colorants can be used. Among known colorants, an organic pigment or an inorganic pigment is preferable.

Examples of the organic pigment include an azo pigment, a polycyclic pigment, a chelate dye, a nitro pigment, a nitroso pigment, and aniline black. Among these, an azo pigment and a polycyclic pigment are more preferable.

Examples of the inorganic pigment include titanium oxide, iron oxide, calcium carbonate, barium sulfate, aluminum hydroxide, yellow barium, cadmium red, chrome yellow, and carbon black. Among these, carbon black is particularly preferable.

Preferred examples of the colorant include the colorants described in paragraphs 0096 to 0100 of JP2009-241586A.

The content of the colorant is preferably in a range of 1% by mass to 25% by mass, more preferably in a range of 2% by mass to 20% by mass, and particularly preferably in a range of 2% by mass to 15% by mass with respect to the total amount of the ink.

(Dispersant)

The ink may contain a dispersant used for dispersing the colorant. As the dispersant, any of a polymer dispersant or a low-molecular-weight surfactant-type dispersant may be used. Further, as the polymer dispersant, any of a water-soluble dispersant or a water-insoluble dispersant may be used.

Preferred examples of the dispersant include dispersants described in paragraphs 0080 to 0096 of JP2016-145312A.

The mixing mass ratio between a colorant (p) and a dispersant (s) (p:s) is preferably in a range of 1:0.06 to 1:3, more preferably in a range of 1:0.125 to 1:2, and still more preferably in a range of 1:0.125 to 1:1.5.

(Resin Particles)

It is preferable that the ink contains at least one kind of resin particles.

In a case where the ink contains resin particles, the ink thickens due to aggregation or dispersion instability of the resin particles in the ink in a case where the resin particles in the ink are brought into contact with the aggregating agent in the pretreatment liquid on the impermeable base material. In this manner, the image quality of the image is improved, and the speed of image recording is increased.

Further, in the case where the ink contains resin particles, the adhesiveness of the image to the impermeable base material is further improved.

From the viewpoint of further improving the adhesiveness of the image, it is preferable that the resin particles contained in the ink include acrylic resin particles.

As the acrylic resin particles, acrylic resin particles which are self-dispersing resin particles are also preferable.

Examples of the self-dispersing resin particles include self-dispersing polymer particles described in paragraphs 0062 to 0076 of JP2016-188345A.

In a case where the resin particles contained in the ink include acrylic resin particles, the proportion of the acrylic resin particles in the entirety of the resin particles contained in the ink is preferably 60% by mass or greater, more preferably 80% by mass or greater, and still more preferably 90% by mass or greater.

In a case where the proportion of the acrylic resin particles in the entirety of the resin particles contained in the ink is 60% by mass or greater, the adhesiveness of the image is further improved.

The glass transition temperature ($T_{gi}$) of the resin particles contained in the ink is not particularly limited, but is preferably 150° C. or lower and more preferably 130° C. or lower from the viewpoint of the manufacturing suitability of the resin particles.

The lower limit of $T_{gi}$ is not particularly limited, but is, for example, 50° C. and preferably 80° C.

Further, the preferred embodiment of the relationship between $T_{gi}$ and $T_{gp}$, (the glass transition temperature of the resin particles contained in the pretreatment liquid) from the viewpoints of the adhesiveness of the image and the rub resistance of the image is as described above.

In the ink according to the embodiment of the present disclosure, from the viewpoints of the adhesiveness of the image, the rub resistance of the image, the manufacturing suitability of the resin particles in the pretreatment liquid, and the manufacturing suitability of the resin particles in the ink, it is particularly preferable that the relationships of "0° C.$<T_{gp}$", "$T_{gi}<150°$ C.", and "30° C.$<T_{gi}-T_{gp}$" are satisfied.

In the present disclosure, in a case where the ink contains two or more kinds of resin particles, the glass transition temperature ($T_{gi}$) of the resin particles contained in the ink indicates the weighted average value of the glass transition temperatures of individual resin particles contained in the ink.

The definition of the weighted average value is as described above (see Mathematical Formula 1 described above).

Further, it is preferable that the resin in the resin particles contained in the ink is a water-insoluble resin.

Further, the volume average particle diameter ($P_i$) of the resin particles contained in the ink is preferably in a range of 1 nm to 200 nm, more preferably in a range of 3 nm to 200 nm, and still more preferably in a range of 5 nm to 50 nm.

The method of measuring the volume average particle diameter of the resin particles is as described above.

Further, the preferred embodiment of the relationship between $P_i$ and $P_p$ (the volume average particle diameter of the resin particles contained in the pretreatment liquid) from the viewpoints of the adhesiveness of the image and the rub resistance of the image is as described above.

In the present disclosure, in a case where the ink contains two or more kinds of resin particles, the volume average particle diameter ($P_i$) of the resin particles contained in the ink indicates the weighted average value of the volume average particle diameters (nm) of individual resin particles contained in the ink.

The definition of the weighted average value is as described above (see Mathematical Formula 1 described above).

The weight-average molecular weights (Mw) of respective resins in the resin particles contained in the ink are respectively preferably in a range of 1000 to 300000, more preferably in a range of 2000 to 200000, and still more preferably in a range of 5000 to 100000.

The method of measuring the Mw is as described above.

The resin in the resin particles contained in the pretreatment liquid has preferably an alicyclic structure or an aromatic ring structure and more preferably an aromatic ring structure.

As the alicyclic structure, an alicyclic hydrocarbon structure having 5 to 10 carbon atoms is preferable, and a cyclohexane ring structure, a dicyclopentanyl ring structure, a dicyclopentenyl ring structure, or an adamantane ring structure is preferable.

As the aromatic ring structure, a naphthalene ring or a benzene ring is preferable, and a benzene ring is more preferable.

The amount of the alicyclic structure or the aromatic ring structure is not particularly limited, but is, for example, preferably in a range of 0.01 mol to 1.5 mol and more preferably in a range of 0.1 mol to 1 mol per 100 g of the resin.

It is preferable that the resin in the resin particles contained in the ink contains an anionic group in the structure.

The anionic group is not particularly limited, but a carboxy group or a sulfo group is preferable, and a sulfo group is more preferable.

The amount of the anionic group is not particularly limited, but is preferably in a range of 0.001 mol to 1.0 mol and more preferably in a range of 0.01 mol to 0.5 mol per 100 g of the resin.

The content of the resin particles is preferably in a range of 1% by mass to 25% by mass, more preferably in a range of 2% by mass to 20% by mass, and still more preferably in a range of 3% by mass to 15% by mass with respect to the total amount of the ink.

(Water-Soluble Solvent)

It is preferable that the ink contains at least one water-soluble solvent.

In this manner, the effect of suppressing drying of the ink or the effect of wetting the ink can be obtained.

The water-soluble solvent which may be contained in the ink can be used, for example, as an anti-drying agent that prevents clogging due to aggregates formed by the ink being attached to an ink jet port of an ejection nozzle and being dried.

From the viewpoints of suppressing drying and performing wetting, as the water-soluble solvent contained in the ink, a water-soluble solvent having a lower vapor pressure than that of water is preferable.

In addition, the boiling point of the water-soluble solvent at 1 atm (1013.25 hPa) is preferably in a range of 80° C. to 300° C. and more preferably in a range of 120° C. to 250° C.

As the anti-drying agent, a water-soluble solvent which has a lower vapor pressure than that of water is preferable.

Specific examples of such a water-soluble solvent include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, an acetylene glycol derivative, glycerin, and trimethylolpropane.

Among these, polyhydric alcohol such as glycerin or diethylene glycol is preferable as the anti-drying agent.

The anti-drying agent may be used alone or in combination of two or more kinds thereof. The content of the anti-drying agent is preferably in a range of 10% by mass to 50% by mass with respect to the total amount of the ink.

The water-soluble solvent may be used for adjusting the viscosity of the ink in addition to other purposes of use described above.

Specific examples of the water-soluble solvent which can be used for adjusting the viscosity include alcohols (such as methanol, ethanol, propanol, isopropanol, butanol, isobutanol, sec-butanol, t-butanol, pentanol, hexanol, cyclohexanol, and benzyl alcohol), polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), glycol derivatives (such as ethylene glycol monomethyl ether, ethylene glycol monoethyl ether, ethylene glycol monobutyl ether, diethylene glycol monomethyl ether, diethylene glycol monobutyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine), and other polar solvents (such as formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone).

In this case, the water-soluble solvent may also be used alone or in combination of two or more kinds thereof.

(Other Additives)

The ink may contain components other than the components described above.

Examples of other components include known additives such as a fading inhibitor, an emulsion stabilizer, a penetration enhancer, an ultraviolet absorbing agent, a preservative, an antibacterial agent, a pH adjuster, a surface tension adjuster, an antifoaming agent, a viscosity adjuster, a dispersion stabilizer, a rust inhibitor, and a chelating agent.

The preparation method for preparing (producing) the ink is not particularly limited, and a known method of mixing respective components of an ink can be used.

<Determination Step>

The determination step is a step of determining whether the surface energy of the impermeable base material is less than 50 mN/m or 50 mN/m or greater.

Here, the surface energy of the impermeable base material indicates the surface energy of the surface of the impermeable base material to which the treatment liquid is applied (that is, the side where the image is formed) between the surfaces of the impermeable base material.

The determination in the determination step is performed based on the information related to the measured value of the surface energy of the impermeable base material or the information related to the kind of the impermeable base material.

Even in a case where the determination in the determination step is performed based on the information related to the measured value of the surface energy of the impermeable base material, the image recording method according to the embodiment of the present disclosure does not necessarily include a step of measuring the surface energy of the impermeable base material to obtain the measured value.

That is, according to the image recording method in this case, the impermeable base material whose surface energy has already been measured so that the measured value of the surface energy is known may be prepared in the impermeable base material preparation step. In the determination step in this case, it is determined whether the surface energy of the impermeable base material is less than 50 mN/m or 50 mN/m or greater based on the information related to the measured value of the surface energy of the impermeable base material, which is already known.

Further, the image recording method according to the embodiment of the present disclosure may include a step of measuring the surface energy of the impermeable base material to obtain the measured value. In the determination step in this case, it is determined whether the surface energy of the impermeable base material is less than 50 mN/m or 50 mN/m or greater based on the measured value of the surface energy obtained in the step of obtaining the measured value.

The step of measuring the surface energy of the impermeable base material to obtain the measured value may be provided before the determination step.

Regardless of whether the image recording method according to the embodiment of the present disclosure includes the step of measuring the surface energy of the impermeable base material to obtain the measured value, the surface energy of the impermeable base material is measured by the Owens-Wendt method.

Specifically, the contact angle between pure water and the surface of a sample cut out from the impermeable base material, the contact angle between diiodomethane and the surface thereof, and the contact angle between ethylene glycol and the surface thereof are respectively measured. These contact angles are measured using, for example, a solid-liquid interface analyzer "Drop Master 500" (manufactured by Kyowa Interface Science, Inc.). A dispersion component γS of the surface energy, a polar component γP of the surface energy, and a hydrogen bond component γH of the surface energy are derived based on these contact angles. The total of the dispersion component γS, the polar component γP, and the hydrogen bond component γH is set as the surface energy (mN/m) of the surface described above.

The details of the Owens-Wendt method can refer to D. K. Owens and R. C. Wendt, J. Appl. Polym. Sci., 13, 1741 (1969).

The surface energy of the impermeable base material may be measured at one site in the surface of the impermeable base material on a side where the treatment liquid is applied (that is, a side where an image is formed).

The surface energy of the impermeable base material is preferably in a range of 20 mN/m to 80 mN/m, more preferably in a range of 30 mN/m to 70 mN/m, and still more preferably in a range of 40 mN/m to 60 mN/m.

As a specific embodiment in a case where the determination in the determination step is performed based on the information related to the kind of the impermeable base material, an embodiment in which the determination is performed by preliminarily preparing a data table obtained by associating the kind of the impermeable base material with the information of whether the surface energy of the impermeable base material is less than 50 mN/m or 50 mN/m or greater and referring to the data table is exemplified.

This data table is prepared based on the measured values obtained by measuring the surface energies of the various impermeable base materials.

Table 1 shows an example of the data table.

TABLE 1

| Surface energy of impermeable base material | Type of impermeable base material |
|---|---|
| Less than 50 mN/m | PP, OPP, PE, PVC |
| 50 mN/m or greater | PET, OPET, NY |

In the present specification, $P_p$ represents a unstretched polypropylene base material, OPP represents a stretched polypropylene base material, PE represents a polyethylene base material, PVC represents a polyvinyl chloride base material, PET represents a unstretched polyethylene terephthalate base material, OPET represents a stretched polyethylene terephthalate base material, and NY represents a nylon base material.

<Decision Step>

The decision step is a step of deciding the heating and drying conditions for heating and drying the pretreatment liquid based on the results obtained in the determination step.

Specifically, in the decision step, the heating and drying condition for heating and drying the pretreatment liquid is decided as a condition A in which the mass ratio of the pretreatment liquid [after being dried/before being dried] is 30% or greater in a case where the surface energy of the impermeable base material is determined to be less than 50 mN/m, and the heating and drying condition for heating and drying the pretreatment liquid is decided as a condition B in which the mass ratio of the pretreatment liquid [after being dried/before being dried] is less than 50% in a case where the surface energy of the impermeable base material is determined to be 50 mN/m or greater.

Specific conditions of each of the conditions A and B include the temperature of heating and drying the pretreatment liquid, the time of heating and drying the pretreatment liquid, and the like.

In a case where the image recording method is performed while the impermeable base material is transported, the time of heating and drying the pretreatment liquid may be adjusted by adjusting the transport speed of the impermeable base material and/or the length of the heating and drying zone. Further, in a case where the heating and drying method is warm air drying, the time of heating and drying the pretreatment liquid may be adjusted by adjusting the time of applying warm air.

The specific conditions of each of the conditions A and B can be decided by performing a preliminary experiment in consideration of the composition of the pretreatment liquid, the amount of the pretreatment liquid to be applied onto the impermeable base material, and the like.

The condition A is a condition in which the mass ratio of the pretreatment liquid [after being dried/before being dried] is 30% or greater. In this manner, occurrence of streaks in the image is suppressed.

From the viewpoint of further suppressing occurrence of streaks in the image, a condition in which the mass ratio of the pretreatment liquid [after being dried/before being dried] is 40% or greater is preferable as the condition A.

From the viewpoint of further suppressing bleeding of the image, the upper limit of the mass ratio of the pretreatment liquid [after being dried/before being dried] under the condition A is preferably 95%, more preferably 90%, and particularly preferably 80%.

The condition B is a condition in which the mass ratio of the pretreatment liquid [after being dried/before being dried] is less than 50%. In this manner, occurrence of bleeding of the image is suppressed.

From the viewpoint of further suppressing bleeding of the image, a condition in which the mass ratio of the pretreatment liquid [after being dried/before being dried] is less than 40% is preferable (35% or less is more preferable) as the condition B.

From the viewpoint of further suppressing occurrence of streaks in the image, the lower limit of the mass ratio of the pretreatment liquid [after being dried/before being dried] under the condition B is preferably 10% and more preferably 15%.

<Pretreatment Liquid Application Step>

The pretreatment liquid application step is a step of applying the pretreatment liquid to the impermeable base material.

The conditions for applying the pretreatment liquid to the impermeable base material can be set regardless of whether the surface energy of the impermeable base material is less than 50 mN/m.

The application of the pretreatment liquid onto the impermeable base material can be performed by applying a known method such as a coating method, an ink jet method, or an immersion method.

Examples of the coating method include known coating methods using a bar coater (such as a wire bar coater), an extrusion die coater, an air doctor coater, a blade coater, a rod coater, a knife coater, a squeeze coater, a reserve roll coater, a gravure coater, or a flexo coater.

The details of the ink jet method are the same as the details of the ink jet method which can be applied to the step of applying the ink described below.

The mass ($g/m^2$) of the pretreatment liquid to be applied per unit area is not particularly limited as long as the components in the ink can be aggregated, but is preferably in a range of $0.1$ $g/m^2$ to $10$ $g/m^2$, more preferably in a range of $0.5$ $g/m^2$ to $6.0$ $g/m^2$, and still more preferably in a range of $1.0$ $g/m^2$ to $4.0$ $g/m^2$.

Further, in the step of applying the pretreatment liquid, the impermeable base material may be heated before the application of the pretreatment liquid. In this case, the heating temperature of the impermeable base material is preferably in a range of 20° C. to 50° C. and more preferably in a range of 25° C. to 40° C.

<Pretreatment Liquid Heating and Drying Step>

The pretreatment liquid heating and drying step is a step of heating and drying the pretreatment liquid applied to the impermeable base material under the heating and drying condition (that is, the condition A or the condition B) set in the decision step.

Each of the condition A and the condition B is as described above.

Examples of the means for heating and drying the treatment liquid include known heating means such as a heater, known air blowing means such as a dryer, and means for combining these.

Examples of the method of heating and drying the pretreatment liquid include a method of applying heat using a heater or the like from a side of the impermeable base material opposite to the surface to which the pretreatment liquid has been applied; a method of applying warm air or hot air to the surface of the impermeable base material to which the pretreatment liquid has been applied; a method of applying heat using an infrared heater from the surface of the impermeable base material to which the pretreatment liquid has been applied or from a side of the impermeable base material opposite to the surface to which the pretreatment liquid has been applied; and a method of combining a plurality of these methods.

As the specific heating and drying conditions, it is preferable that both the condition A and the condition B are adjusted to be in the following ranges.

The heating temperature of heating and drying the impermeable base material is preferably 30° C. or higher, more preferably 35° C. or higher, and still more preferably 40° C. or higher.

The upper limit of the heating temperature is not particularly limited. For example, the upper limit thereof may be 100° C., and is preferably 90° C. and more preferably 70° C.

The time of heating and drying the treatment liquid is not particularly limited, but is preferably in a range of 0.5 seconds to 60 seconds, more preferably in a range of 0.5 seconds to 20 seconds, and particularly preferably in a range of 0.5 seconds to 10 seconds.

<Ink Application Step>

The ink application step is a step of applying the ink to at least a part of the surface of the impermeable base material after the heating and drying, onto which the pretreatment liquid has been applied, to record an image.

The ink can be selectively applied onto the impermeable base material by performing the above-described step. In this manner, a desired image (specifically, a visible image) can be recorded.

In the present step, the ink may be applied onto the entire surface of the impermeable base material after the heating and drying, onto which the pretreatment liquid has been applied, or the ink may be applied to a part of the surface of the impermeable base material after the heating and drying, onto which the pretreatment liquid has been applied. In a case where the ink is applied to a part of the surface, an image is recorded on the part of the surface of the impermeable base material after the heating and drying, onto which the pretreatment liquid has been applied, and the other part is an image non-recorded region.

In the ink application step, only one kind of ink or two or more kinds of inks may be applied. In a case where two or more kinds of inks are applied in the ink application step, the two or more kinds of inks are prepared in the ink preparation step.

As the method of applying the ink in the ink application step, a known method such as a coating method, an ink jet method, or an immersion method can be employed.

Among these, an ink jet method is preferable.

The method of jetting the ink in the ink jet method is not particularly limited, and any of known methods such as an electric charge control method of jetting an ink using an electrostatic attraction force; a drop-on-demand method (pressure pulse method) using a vibration pressure of a piezoelectric element; an acoustic ink jet method of jetting an ink using a radiation pressure by changing an electric signal into an acoustic beam and radiating the acoustic beam to the ink; and a thermal ink jet (bubble jet (registered trademark)) method of heating an ink to form bubbles and utilizing the generated pressure may be used.

As an ink jet method, particularly, an ink jet method, described in JP1979-059936A (JP-S54-059936A), of jetting an ink from a nozzle using an action force caused by a rapid change in volume of the ink after being subjected to an action of thermal energy can be effectively used.

Further, the method described in paragraphs 0093 to 0105 of JP2003-306623A can also be employed as the ink jet method.

The application of the ink according to the ink jet method is performed by allowing the ink to be jetted from a nozzle of an ink jet head.

Examples of the system of the ink jet head include a shuttle system of performing recording while scanning a short serial head in the width direction of the impermeable base material and a line system of using a line head in which recording elements are aligned in correspondence with the entire area of one side of the impermeable base material.

In the line system, image recording can be performed on the entire surface of the impermeable base material by scanning the impermeable base material in a direction intersecting the direction in which the recording elements are aligned. In the line system, a transport system such as a carriage that scans a short head in the shuttle system is not necessary. Further, in the line system, since movement of a carriage and complicated scanning control between the head and the impermeable base material are not necessary as compared with the shuttle system, only the impermeable base material moves. Therefore, according to the line system, image recording at a higher speed than that of the shuttle system can be realized.

From the viewpoint of obtaining a high-definition image, the liquid droplet amount of the ink to be jetted from the nozzle of the ink jet head is preferably in a range of 1 μL (pico liter) to 10 μL and more preferably in a range of 1.5 μL to 6 μL.

In addition, from the viewpoints of improving the image irregularity and improving connection of continuous gradations, it is also effective that the ink is jetted by combining different amounts of liquid droplets.

In the ink application step, the applied ink may be heated and dried to obtain an image.

Examples of the means for performing heating and drying include known heating means such as a heater, known air blowing means such as a dryer, and means for combining these.

Examples of the method for heating and drying the ink include a method of applying heat using a heater or the like from a side of the impermeable base material opposite to the surface to which the ink has been applied; a method of applying warm air or hot air to the surface of the impermeable base material to which the ink has been applied; a method of applying heat using an infrared heater from the surface of the impermeable base material to which the ink has been applied or from a side of the impermeable base material opposite to the surface to which the ink has been applied; and a method of combining a plurality of these methods.

The heating temperature of heating and drying the ink is preferably 55° C. or higher, more preferably 60° C. or higher, and particularly preferably 65° C. or higher.

The upper limit of the heating temperature of heating and drying the ink is not particularly limited, and the upper limit thereof may be, for example, 100° C. and is preferably 90° C.

The time of heating and drying the ink is not particularly limited, but is preferably in a range of 3 seconds to 60 seconds, more preferably in a range of 5 seconds to 60 seconds, and particularly preferably in a range of 10 seconds to 45 seconds.

<One Example of Image Recording Device>

An image recording device for performing the image recording method according to the embodiment of the present disclosure described above is not particularly limited.

Hereinafter, an example of the image recording device which can be suitably used for the image recording method according to the embodiment of the present disclosure will be described with reference to FIG. 2.

Figure 2:
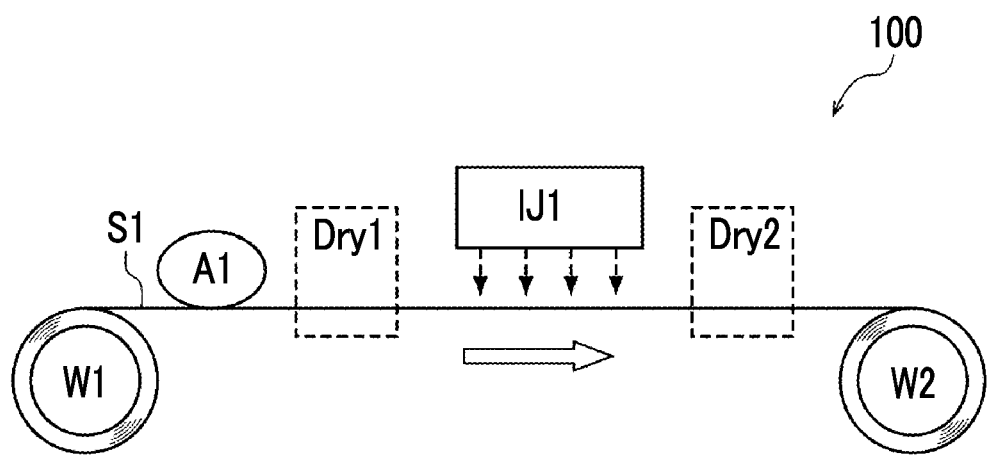
FIG. 2 is a schematic configuration view conceptually showing an example of an image recording device suitable for performing the image recording method of the present disclosure.

FIG. 2 is a view conceptually showing the image recording device 100 which is an example of the image recording device.

As shown in FIG. 2, an image recording device 100 is a device which unwinds a long impermeable base material S wound in a roll shape to record an image on the unwound impermeable base material S1 using the image recording method according to the embodiment of the present disclosure and winds the impermeable base material S1 on which the image has been recorded.

The image recording device 100 comprises a pretreatment liquid applying device A1 serving as a pretreatment liquid applying unit, a pretreatment liquid drying zone Dry1 serving as a heating and drying unit, an ink jet ink applying device IJ1 serving as an ink applying unit, and an ink drying zone Dry2.

The image recording device 100 further comprises an unwinding device W1 for unwinding a long impermeable base material S that is wound in a roll shape, a transport system (not shown) for transporting the impermeable base material S1 in the direction indicated by the block arrow, and a winding device W2 for winding the impermeable base material S1 on which an image has been recorded (hereinafter, also referred to as an "image recorded material").

Further, a surface treatment unit (not shown) for performing a surface treatment (preferably, a corona treatment) on the impermeable base material S1 may be provided on the upstream side of the impermeable base material S1 in the transport direction with respect to the pretreatment liquid applying device A1.

In addition, since FIG. 2 is a conceptual view, the view is shown such that the impermeable base material S1 is transported in one direction by simplifying the transport path of the impermeable base material S1. Practically, it goes without saying that the transport path of the impermeable base material S1 may meander. The method of transporting the impermeable base material S1 can be appropriately selected from various web transport methods of using a drum, a roller, and the like.

The method and the conditions exemplified in the section of "the image recording method" can be employed as the method and the conditions for applying the pretreatment liquid using the pretreatment liquid applying device A1.

The method and the conditions exemplified in the section of "the image recording method" can be employed as the method and the conditions for drying the pretreatment liquid in the pretreatment liquid drying zone Dry1.

The method and the conditions exemplified in the section of the step of applying the ink can be employed as the method and the conditions for applying the ink using the ink applying device IJ1.

The method and the conditions exemplified in the section of the step of applying the ink can be employed as the method and the conditions for drying the ink in the ink drying zone Dry2.

Although not shown, the structure of the ink applying device IJ1 may be a structure comprising at least one ink jet head.

The ink jet head may be a shuttle head, but a line head in which a large number of jet ports (nozzles) are aligned in the width direction of a long impermeable base material is preferable as the ink jet head from the viewpoint of speeding up of image recording.

From the viewpoint of speeding up of image recording, it is preferable that the structure of the ink applying device IJ1 is a structure comprising at least one of a line head for black (K) ink, a line head for cyan (C) ink, a line head for magenta (M) ink, or a line head for yellow (Y) ink.

As the structure of the ink applying device IJ1, a structure which comprises at least two of the above-described four line heads and in which two or more of these line heads are aligned in the transport direction of the impermeable base material (the direction indicated by the block arrow) is more preferable.

The ink applying device IJ1 may further comprise at least one of a line head for white ink, a line head for orange ink, a line head for green ink, a line head for purple ink, a line head for light cyan ink, or a line head for light magenta ink.

Next, an example of the image recording method according to the embodiment of the present disclosure for which the image recording device 100 is used will be described.

First, an impermeable base material preparation step, a pretreatment liquid preparation step, and an ink preparation step are performed outside the image recording device 100.

In the impermeable base material preparation step, a long impermeable base material S1 (hereinafter, also referred to as a "roll") wound in a roll shape is prepared. This roll is set on the unwinding device W1.

The pretreatment liquid prepared in the pretreatment liquid preparation step is set in the pretreatment liquid applying device A1.

In the ink preparation step, one color or two or more colors of inks are prepared. The prepared inks are set in the ink applying device IJ1.

Next, an operator (that is, a person) performs each of determination of the surface energy of the impermeable base material S1 in the determination step and decision of the heating and drying condition of the pretreatment liquid in the decision step.

The operator manually sets the specific heating and drying conditions (for example, the drying temperature and the drying time) in the pretreatment liquid drying zone Dry1 according to the heating and drying condition (that is, the condition A or the condition B) for the pretreatment liquid which has been decided in the decision step.

Next, the long impermeable base material S that has been wound in a roll shape is unwound by the unwinding device W1, the unwound impermeable base material S1 is transported in the direction indicated by the block arrow, the pretreatment liquid application step is performed by the pretreatment liquid applying device A1, the heating and drying step is performed by the pretreatment liquid drying zone Dry1, and the ink application step (that is, image recording) is performed by ink jet ink applying device IJ1 and the ink drying zone Dry2. The impermeable base material S1 on which an image has been recorded (hereinafter, also referred to as an "image recorded material") is wound by the unwinding device W2.

In the image recording method according to this example, an appropriate heating and drying condition for heating and drying the pretreatment liquid is decided according to the surface energy of the impermeable base material S1, and the pretreatment liquid is heated and dried in the pretreatment liquid drying zone Dry1 based on the decided heating and drying condition. Therefore, it is possible to suppress streaks of an image due to the insufficient spread of the ink dots and to suppress bleeding of an image due to the excessive spread of the ink dots.

[Image Recording System]

Hereinafter, an image recording system according to the embodiment of the present disclosure, which is suitably used to perform the image recording method according to the embodiment of the present disclosure, will be described.

The image recording system of the present disclosure is used, for example, in the image recording method of the present disclosure described above.

An image recording system according to the embodiment of the present disclosure comprises a determining unit which determines whether the surface energy of the impermeable base material is less than 50 mN/m or 50 mN/m or greater; a deciding unit which decides the heating and drying condition for heating and drying the pretreatment liquid as a condition A in which the percentage of the mass of the pretreatment liquid after being heated and dried to the mass of the pretreatment liquid before being heated and dried is 30% or greater in a case where the surface energy of the impermeable base material is determined to be less than 50 mN/m and decides the heating and drying condition for heating and drying the pretreatment liquid as a condition B in which the percentage of the mass of the pretreatment liquid after being heated and dried to the mass of the pretreatment liquid before being heated and dried is less than 50% in a case where the surface energy of the impermeable base material is determined to be 50 mN/m or greater; a pretreatment liquid applying unit which applies a pretreatment liquid to an impermeable base material; a heating and drying unit which heats and dries the pretreatment liquid applied to the impermeable base material under the heating and drying condition decided by the deciding unit; and an ink applying unit which applies the ink to at least a part of the surface of the impermeable base material after the heating and drying, onto which the pretreatment liquid has been applied, to record an image.

The determination step, the decision step, and the pretreatment liquid application step, the pretreatment liquid heating and drying step, and the ink application step in the image recording method according to the embodiment of the present disclosure are respectively performed by the determining unit, the deciding unit, the pretreatment liquid applying unit, the heating and drying unit, and the ink applying unit in the image recording system according to the embodiment of the present disclosure.

Therefore, according to the image recording system according to the embodiment of the present disclosure, an image in which streaks and bleeding are suppressed can be recorded.

Figure 3:
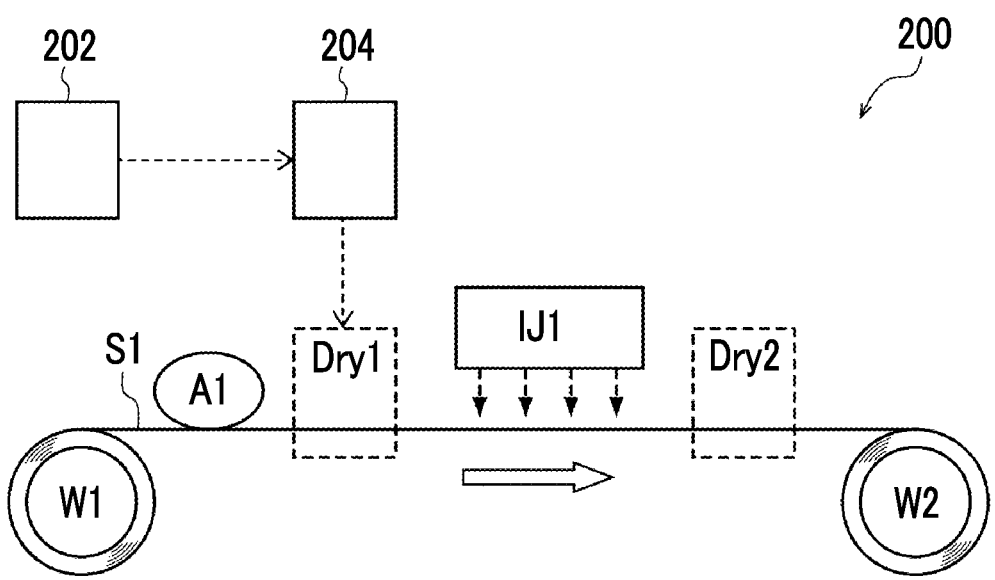
FIG. 3 is a schematic configuration view conceptually showing an example of an image recording system of the present disclosure.

FIG. 3 is a schematic configuration view conceptually showing an image recording system 200 which is an example of the image recording system according to the embodiment of the present disclosure.

As shown in FIG. 3, the configuration of the image recording system 200 is the same as the configuration of the image recording device 100 shown in FIG. 2 described above, except that a determining unit 202 and a deciding unit 204 are added.

The determining unit 202 automatically determines whether the surface energy of the impermeable base material S is less than 50 mN/m or 50 mN/m or greater based on the information related to the measured value of the surface energy of the impermeable base material S1 or the information related to the kind of the impermeable base material S1.

A method by which the determining unit 202 acquires the above-described information is not particularly limited.

Examples of the method by which the determining unit 202 acquires the above-described information include a method of receiving the information transmitted from outside the determining unit 202, a method of reading the information from a recording medium on which the information is recorded, and a method of inputting the information to the determining unit 202 by the operator.

The determination results in the determining unit 202 is transmitted to the deciding unit 204.

The deciding unit 204 decides whether the heating and drying condition for heating and drying the pretreatment liquid is the condition A or the condition B, based on the determination result transmitted from the determining unit 202.

The information related to the heating and drying condition (that is, the condition A or the condition B) decided by the deciding unit 204 is transmitted to the pretreatment liquid drying zone Dry1.

The heating and drying condition in the pretreatment liquid drying zone Dry1 is set based on the information (that is, the information related to whether the condition is set as the condition A or the condition B) transmitted from the deciding unit 204.

In the pretreatment liquid drying zone Dry1, each of the condition A and the condition B is set by being converted into specific conditions such as the drying temperature, the drying time, and the like.

Specific conditions corresponding to each of the condition A and the condition B are decided by performing a preliminary experiment in consideration of the composition of the pretreatment liquid, the amount of the pretreatment liquid to be applied onto the impermeable base material, and the like.

The image recording system 200 comprises the determining unit 202 and the deciding unit 204 which are independent from each other. The embodiment of the image recording system of the present disclosure is not limited to the embodiment of the image recording system 200 and may comprise, for example, one control unit including the determining unit 202 and the deciding unit 204.

Further, the image recording system 200 may further comprise a measuring unit for measuring the surface energy of the impermeable base material S1. In a case where the image recording system 200 comprises a measuring unit, the information related to the measured value obtained by the measuring unit is transmitted to the determining unit 202.

The determining unit 202 receives the transmitted information and determines whether the surface energy of the impermeable base material S is less than 50 mN/m or 50 mN/m or greater based on the received information.

In one example of the image recording method according to the embodiment of the present disclosure for which the image recording system 200 is used, the determination of the surface energy of the impermeable base material S1 in the determination step and the decision of the heating and drying condition of the pretreatment liquid in the decision step are performed by the determining unit 202 and the deciding unit 204 (that is, a device) instead of the operator (that is, a person). Further, the heating and drying condition of the pretreatment liquid (that is, the condition A or the condition B) is transmitted from the deciding unit 204 to the pretreatment liquid drying zone Dry1, and the setting of the specific heating and drying condition is automatically performed in the pretreatment liquid drying zone Dry1 based on the heating and drying condition of the pretreatment liquid.

The example of the image recording method according to the embodiment of the present disclosure for which the image recording system 200 is used is the same as the example of the image recording method according to the embodiment of the present disclosure for which the image recording device 100 is used, except for these points.

Therefore, even in the image recording method according to the example, the heating and drying condition appropriate for heating and drying the pretreatment liquid is decided according to the surface energy of the impermeable base material S1, and the pretreatment liquid is heated and dried in the pretreatment liquid drying zone Dry1 based on the decided heating and drying condition. Therefore, streaks of an image due to the insufficient spread of the ink dots is suppressed, and bleeding of an image due to the excessive spread of the ink dots is suppressed.

Figure 4:
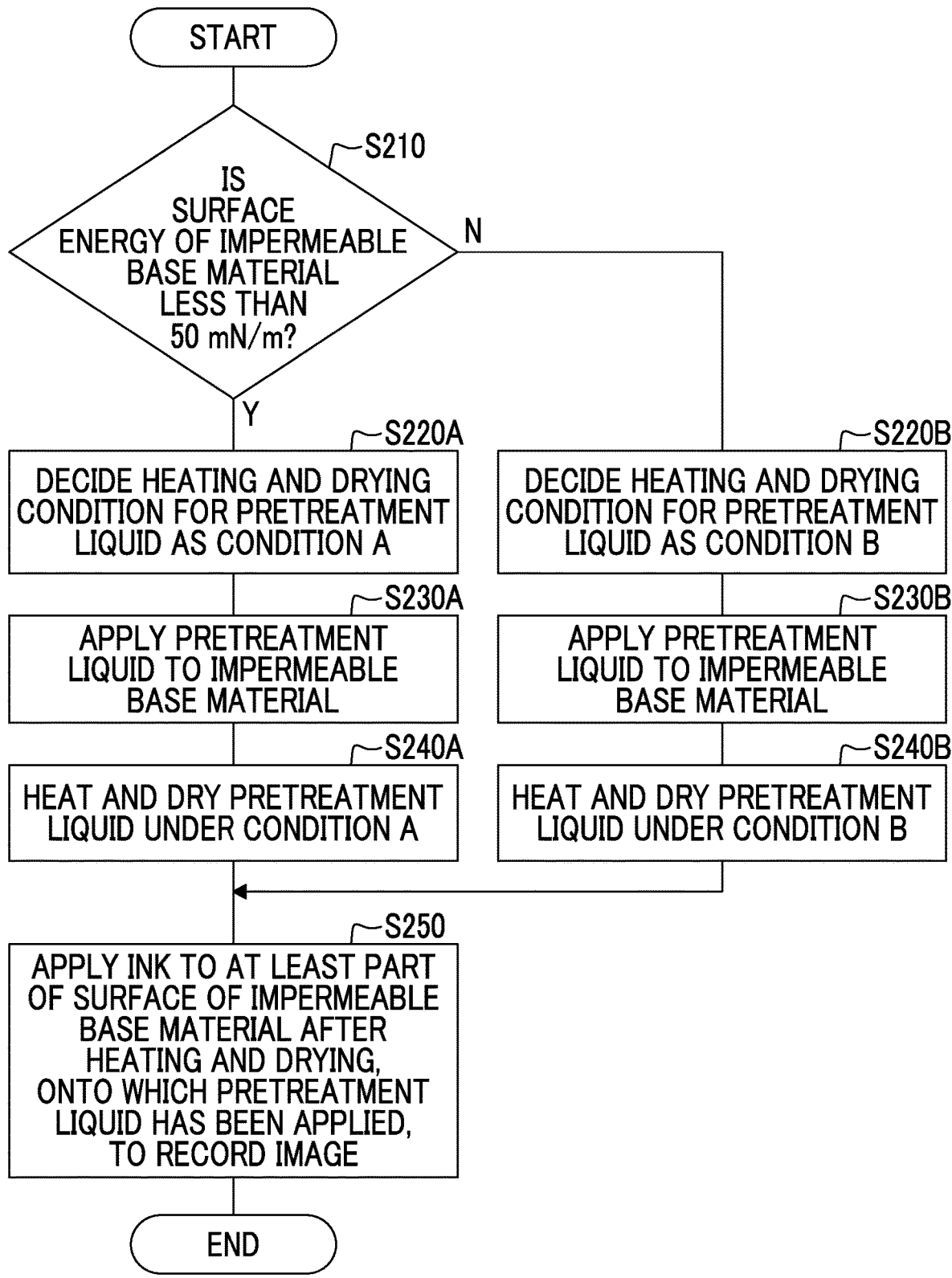
FIG. 4 is a flowchart showing an example of a control routine in an example of the image recording system of the present disclosure.

FIG. 4 is a flowchart showing an example of a control routine in the image recording system 200.

The present routine is started by turning on the power of the image recording system 200.

First, the determining unit 202 determines whether the surface energy of the impermeable base material S1 is less than 50 mN/m in Step S210.

In a case where it is determined that the surface energy of the impermeable base material S is less than 50 mN/m in Step S210, the process proceeds to Step S220A.

The heating and drying condition of the pretreatment liquid is decided as the condition A by the deciding unit 204 in Step S220A, the pretreatment liquid is applied to the impermeable base material by the pretreatment liquid applying device A1 in Step S230A, and the pretreatment liquid is heated and dried by the pretreatment liquid drying zone Dry1 under the condition A in Step S240A.

Next, the ink is applied to at least a part of the surface of the impermeable base material after the heating and drying, onto which the pretreatment liquid has been applied, and dried by the ink jet ink applying device IJ1 and the ink drying zone Dry2 so that an image is recorded in Step S250.

Next, the present routine is completed (ends) by turning off the power of the image recording system 200.

In a case where it is determined that the surface energy of the impermeable base material S is not less than 50 mN/m (that is, 50 mN/m or greater) in Step S210, the process proceeds to Step S220B.

The heating and drying condition of the pretreatment liquid is decided as the condition B by the deciding unit 204 in Step S220B, the pretreatment liquid is applied to the impermeable base material by the pretreatment liquid applying device A1 in Step S230B, and the pretreatment liquid is heated and dried by the pretreatment liquid drying zone Dry1 under the condition B in Step S240B.

Next, the ink is applied to at least a part of the surface of the impermeable base material after the heating and drying, onto which the pretreatment liquid has been applied, and dried by the ink jet ink applying device IJ1 and the ink drying zone Dry2 so that an image is recorded in Step S250.

Next, the present routine is completed (ends) by turning off the power of the image recording system 200.

EXAMPLES

Hereinafter, the present invention will be described in more detail based on examples, but the present invention is not limited to the following examples unless the gist thereof is overstepped. Further, "parts" and "%" are on a mass basis unless otherwise specified.

<Preparation of Aqueous Dispersion Liquid of Resin Particles for Preparing Pretreatment Liquid>

As an aqueous dispersion liquid of resin particles for preparing a pretreatment liquid, "PESRESIN A615GE" (an aqueous dispersion liquid of composite resin particles AE1 containing an acrylic resin and a polyester resin) (manufactured by Takamatsu Oil & Fat Co., Ltd.) was prepared.

The glass transition temperature $T_g$ of the composite resin particles AE1 was 47° C., and the volume average particle diameter $P_p$ of the composite resin particles AE1 was 45 nm. The mass ratio [polyester resin/acrylic resin] in the composite resin particles AE1 was 0.9.

<Preparation of Aqueous Dispersion Liquid of Resin Particles for Preparing Ink>

As an aqueous dispersion liquid of resin particles for preparing an ink, an aqueous dispersion liquid of acrylic resin particles IA-1 prepared as described below was prepared.

(Preparation of Aqueous Dispersion Liquid of Acrylic Resin Particles IA-1)

A 2 L three-neck flask provided with a stirrer, a thermometer, a reflux cooling pipe, and a nitrogen gas introduction pipe was charged with 560.0 g of methyl ethyl ketone, and the solution was heated to 87° C. Next, a mixed solution formed of 220.4 g of methyl methacrylate, 301.6 g of isobornyl methacrylate, 58.0 g of methacrylic acid, 108 g of methyl ethyl ketone, and 2.32 g of "V-601" (polymerization initiator, manufactured by FUJIFILM Wako Pure Chemical Corporation; dimethyl 2,2'-azobis(2-methylpropionate)) was added dropwise to the methyl ethyl ketone in the reaction container at a constant speed such that the dropwise addition was completed for 2 hours while the reflux state in the reaction container was maintained (hereinafter, the reflux state was maintained until the reaction was completed). After the completion of the dropwise addition, the solution was stirred for 1 hour, and the operation of the following step (1) was performed on the solution after being stirred for 1 hour.

Step (1) . . . A solution formed of 1.16 g of "V-601" and 6.4 g of methyl ethyl ketone was added to the solution, and the resulting solution was stirred for 2 hours.

Next, the operation of the step (1) was repeatedly performed four times, a solution formed of 1.16 g of "V-601" and 6.4 g of methyl ethyl ketone was added to the solution, and the resulting solution was stirred for 3 hours (the operation carried out so far is referred to as the "reaction").

After the completion of the reaction, the temperature of the solution was decreased to 65° C., 163.0 g of isopropanol was added to the solution, and the solution was allowed to be naturally cooled, thereby obtaining a polymerization solution (concentration of solid contents: 41.0%) containing a copolymer of methyl methacrylate, isobornyl methacrylate, and methacrylic acid (=38/52/10 [mass ratio]).

The weight-average molecular weight (Mw) of the copolymer was 63000, and the acid value thereof was 65.1 (mgKOH/g).

Next, 317.3 g (concentration of solid contents: 41.0% by mass) of the obtained polymerization solution was weighed, 46.4 g of isopropanol, 1.65 g of a 20% maleic acid anhydride aqueous solution (water-soluble acidic compound, corresponding to 0.3% by mass as maleic acid with respect to the copolymer), and 40.77 g of a 2 mol/L NaOH aqueous solution were added to the solution, and the temperature of the liquid in the reaction container was increased to 70° C.

Next, 380 g of distilled water was added dropwise to the solution, which had been heated to 70° C., at a speed of 10 ml/min, and water dispersion was performed (dispersion step).

Thereafter, a total amount of 287.0 g of isopropanol, methyl ethyl ketone, and distilled water was distilled off by maintaining the temperature of the liquid in the reaction container at 70° C. for 1.5 hours under reduced pressure (solvent removal step). 0.278 g (440 ppm as benzisothiazolin-3-one as the solid content in the polymer) of PROXEL GXL (S) (manufactured by Arch Chemicals, Inc.) was added to the obtained solution.

The obtained liquid was filtered using a filter having a mesh diameter of 1 μm, and the filtrate was collected, thereby obtaining an aqueous dispersion liquid of acrylic resin particles IA-1 whose concentration of solid contents was 26.5% by mass.

The glass transition temperature $T_{gi}$ of the acrylic resin particles IA-1 was 120° C., and the volume average particle diameter $P_i$ of the acrylic resin particles IA-1 was 10 nm.

Example 1

Image recording was performed using the image recording device 100 shown in FIG. 2.

The transport speed of the impermeable base material S1 (that is, the traveling speed of the impermeable base material S1) was 635 mm/sec.

As the pretreatment liquid applying device A1, a wire bar coater was used.

Warm air drying was used as the drying method in the pretreatment liquid drying zone Dry1.

The ink jet head and the ink jetting conditions for the ink applying device IJ1 were as follows.

Ink jet head: 1200 dpi (dot per inch, 1 inch is 2.54 cm)/20-inch width piezo full line head (total number of nozzles: 2048) was used.
Ink droplet amount: Each amount was set to 2.4 μL.
Driving frequency: 30 kHz Warm air drying was used as the drying method in the ink drying zone Dry2.

<Preparation of Pretreatment Liquid>

A pretreatment liquid having the following composition was prepared.

—Composition of Pretreatment Liquid—
Aggregating agent (glutaric acid, manufactured by FUJI-FILM Wako Pure Chemical Corporation; organic acid) . . . 4% by mass
Composite resin particles AE1 (resin particles) . . . 8% by mass 1,2-Propanediol (manufactured by FUJIFILM Wako Pure Chemical Corporation) (water-soluble solvent) . . . 10% by mass
Antifoaming agent (TSA-739 (15% by mass), manufactured by Momentive Performance Materials Japan LLC, emulsion type silicone antifoaming agent) . . . 0.01% by mass as solid content of antifoaming agent
OLFINE E1010 (manufactured by Nissin Chemical Co., Ltd.) (surfactant) . . . 0.1% by mass
Water . . . remaining amount set such that total amount was 100% by mass <Preparation of Cyan Ink>

A cyan ink with the following composition was prepared.
—Composition of Cyan Ink—
Projet Cyan APD1000 (manufactured by FUJIFILM Imaging Colorants Inc., cyan pigment dispersion liquid, pigment concentration: 12% by mass) . . . 2.4% by mass as solid content
1,2-Propanediol (manufactured by FUJIFILM Wako Pure Chemical Corporation) (water-soluble solvent) . . . 20% by mass
OLFINE E1010 (manufactured by Nissin Chemical Corporation) (surfactant) . . . 1% by mass
Acrylic resin particles IA-1 (resin particles) . . . 8% by mass as amount of resin particles
SNOWTEX (registered trademark) XS (manufactured by Nissan Chemical Co., Ltd., colloidal silica) . . . 0.06% by mass as solid content of silica
Water . . . remaining amount set such that total amount was 100% by mass <Preparation of Impermeable Base Material S1>

A roll body in which an impermeable base material S1 having a thickness of 25 μm, a width of 500 mm, and a length of 2000 μm (biaxially oriented polypropylene base material "P2161", manufactured by Toyobo Co., Ltd.; hereinafter, also referred to as "OPP") was wound in a roll shape (hereinafter, also referred to as a "roll body 1") was prepared.

The impermeable base material S1 was unwound from the roll body 1 and the surface energy was measured. As the result, the surface energy thereof was 40 mN/m.

<Determination of Surface Energy of Impermeable Base Material S1>

It was determined whether the surface energy of the impermeable base material S1 was less than 50 mN/m or 50 mN/m or greater.

In Example 1, since the surface energy of the impermeable base material was 40 mN/m, the surface energy of the impermeable base material was determined to be less than 50 mN/m.

<Decision of Heating and Drying Condition for Pretreatment Liquid>

The heating and drying condition for the pretreatment liquid in the pretreatment liquid drying zone Dry1 was decided based on the determination result of the surface energy of the impermeable base material S1.

In Example 1, since the surface energy of the impermeable base material was determined to be less than 50 mN/m the heating and drying condition for the pretreatment liquid was decided as the "condition A" in which the mass ratio of the pretreatment liquid [after being dried/before being dried] was 30% or greater.

Specific values of the mass ratios of the pretreatment liquids [after being dried/before being dried] are as listed in Table 2.

In Example 1, the heating and drying condition of the pretreatment liquid in the pretreatment liquid drying zone Dry1 was set to the following specific condition as the condition A.

—Specific Heating and Drying Condition as Condition A—
Drying temperature: 30° C.
Drying time: 3 seconds <Application and Heating and Drying of Pretreatment Liquid, and Image Recording>

The roll body 1 (that is, the roll body around which the impermeable base material S is wound) was set in the unwinding device W1.

Further, the pretreatment liquid was set in the pretreatment liquid applying device A1, and the cyan ink was set in the ink applying device IJ1.

The impermeable base material S was unwound from the roll body 1 by the unwinding device W1, and the unwound impermeable base material S1 was transported at the above-described transport speed.

One surface of the impermeable base material S1 during the transport was entirely coated with the pretreatment liquid using the pretreatment liquid applying device A1 such that the mass of the pretreatment liquid to be applied per unit area (that is, the amount of the pretreatment liquid before being dried) was set to 1.8 g/m$^2$. The applied pretreatment liquid was heated and dried in the pretreatment liquid drying zone Dry1 under the above-described condition A.

Next, the cyan ink was applied in the form of a solid image according to the ink jet method to a part of the surface (that is, the entire one surface) of the impermeable base material S1 after the heating and drying, onto which the pretreatment liquid had been applied, using the ink applying device IJ1. Here, the region where the cyan ink was applied was set as a band-shaped region having a width of 250 mm with a central portion in the width direction as a center in a total width of 500 mm of the impermeable base material S1. Here, the mass of the cyan ink to be applied per unit area in the region where the cyan ink was applied was set to 3 g/m$^2$.

Next, the applied cyan ink was dried at 80° C. for 8 seconds in the ink drying zone Dry2.

As described above, a cyan solid image was recorded on the entire band-shaped region having a width of 250 mm described above.

Each of the regions with a width of 125 mm at both ends of the impermeable base material S1 in the width direction was an image non-recorded region.

Finally, the impermeable base material S1 (that is, the image recorded material) on which the cyan solid image was recorded was wound by a winding device W2 under a condition of a winding pressure (surface pressure) of 50 kPa.

Hereinafter, the wound image recorded material will be referred to as a "roll body 2".

The image recorded material was unwound from the roll body 2, and the following evaluations were performed using the unwound image recorded material.

<Evaluation of Streaks in Image>

In the cyan solid image of the image recorded material unwound from the roll body 2, a region having a length of 500 mm and a width of 30 mm was selected as a streak evaluation region.

This streak evaluation region was selected as a region where the center of the streak evaluation region in the longitudinal direction (500 mm) coincides with the center of the image recorded material in the longitudinal direction (2000 μm), and the center of the streak evaluation region in the width direction (30 mm) coincides with the center of the image recorded material in the width direction (500 mm).

The selected streak evaluation region was visually observed using an optical microscope (magnification of 50 times), and streaks in the image were evaluated based on the following evaluation standards.

—Evaluation Standards for Streaks in Image—

5: Streaks were not found in the cyan solid image by visual observation, and it was confirmed that ink dots did not have gaps therebetween by observation using an optical microscope (magnification of 50 times).

4: Streaks were not found in the cyan solid image by visual observation, and it was confirmed that ink dots had gaps therebetween by observation using an optical microscope (magnification of 50 times), and the gap was 1/10 or less of the ink dot diameter.

3: Streaks were not found in the cyan solid image by visual observation, and it was confirmed that ink dots had gaps therebetween by observation using an optical microscope (magnification of 50 times), and the gap was greater than 1/10 and 1/3 or less of the ink dot diameter.

2: Streaks were partially found in the cyan solid image by visual observation.

1: Streaks were entirely found in the cyan solid image by visual observation.

<Evaluation of Adhesiveness of Image>

In the image recorded material unwound from the roll body 2, a region with a length of 500 mm and a width of 500 mm, adjacent to one end side of the image recorded material in the longitudinal direction with respect to the streak evaluation region was selected as an adhesiveness evaluation region.

Next, the adhesiveness evaluation region was cut out from the image recorded material and used as a sample for evaluating the adhesiveness.

Next, the adhesiveness of the image was evaluated by attaching a piece of mending tape ("SCOTCH" (registered trademark), manufactured by 3M Company, width of 18 mm) onto the cyan solid image in the sample for evaluating the adhesiveness and peeling the piece of tape off from the cyan solid image.

Specifically, the tape was attached to and peeled off according to the following method.

The tape was taken out at a constant speed and cut to have a length of approximately 75 mm, thereby obtaining a piece of tape.

The obtained piece of tape was superimposed on the cyan solid image, and a region at the central portion of the piece of tape with a width of 18 mm and a length of 25 mm was attached onto the image using a finger and rubbed firmly with a fingertip.

An end of the piece of tape was grasped in 5 minutes after the piece of tape was attached onto the image and was peeled off from the image at an angle as close as possible to 60° for 0.5 to 1.0 seconds.

The presence or absence of adhesive matter on the piece of peeled tape and the presence or absence of peeling of the cyan solid image on the impermeable base material in the sample for evaluating the adhesiveness were visually observed, and the adhesiveness of the image was evaluated according to the following evaluation standards.

The results are listed in Table 2.

—Evaluation Standards for Adhesiveness of Image—

A: Adhesive matter was not found on the piece of tape, and peeling of the image on the impermeable base material was not found.

B: A small amount of colored adhesive matter was found on the piece of tape, but peeling of the image on the impermeable base material was not found.

C: Peeling of the image on the impermeable base material was found.

<Evaluation of Bleeding of Image>

The character images (unicode: U+9DF9; 2 pt, 3 pt, 4 pt, and 5 pt) shown in FIG. 5 were recorded in the same manner as in "application and heating and drying of pretreatment liquid, and image recording" described above except that the cyan ink was applied in the form of a character image in place of the application of the cyan ink in the form of a solid image.

The recorded character images were observed, and bleeding of the images was evaluated based on the following evaluation standards.

The results are listed in Table 2.

In the evaluation standards described below, the rank at which bleeding of the image is most suppressed is "5".

—Evaluation Standards for Bleeding of Image—

5: Characters having a font size of 2 pt were able to be reproduced.

4: Characters having a font size of 3 pt were able to be reproduced, but characters having a font size of 2 pt were not able to be reproduced.

3: Characters having a font size of 4 pt were able to be reproduced, but characters having a font size of 3 pt or less were not able to be reproduced.

2: Characters having a font size of 5 pt were able to be reproduced, but characters having a font size of 4 pt or less were not able to be reproduced.

1: Characters having a font size of 5 pt were not able to be reproduced.

Figure 5:
FIG. 5 is a view conceptually showing character images used for evaluation of bleeding of images in examples.
Figure 5:
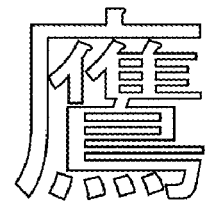
Figure 5:
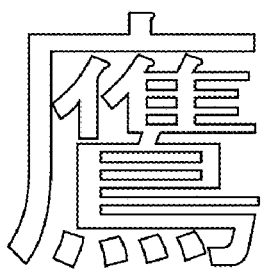
Figure 5:
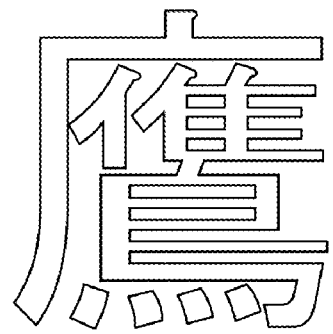
Figure 6:
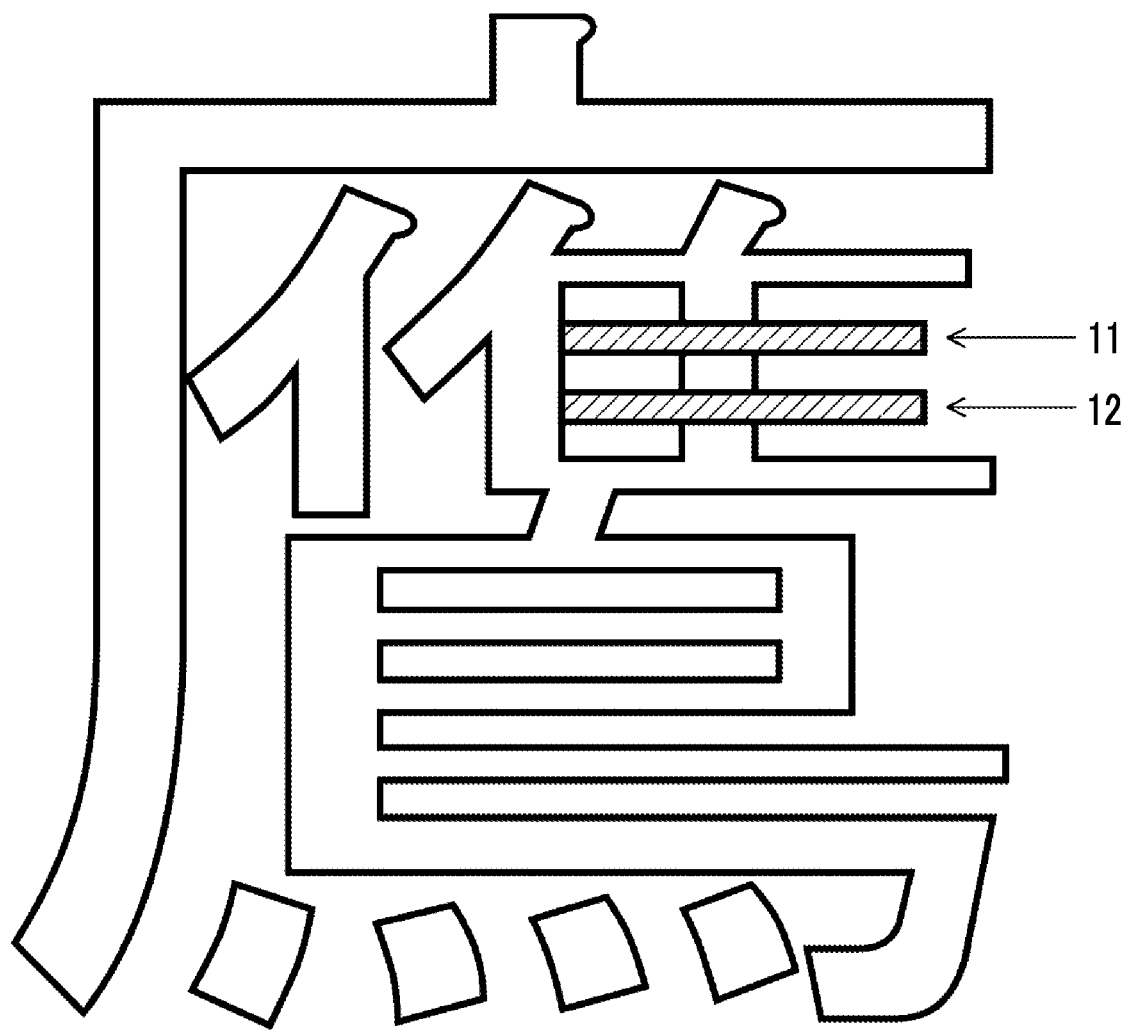
FIG. 6 is a view for explaining the details of evaluation standards of bleeding of images in examples.

Further, the expression "able to be reproduced" means that the horizontal line indicated by the reference numeral 11 shown in FIG. 6 and the horizontal line indicated by the reference numeral 12 shown in FIG. 6 in the character images shown in FIG. 5 were separated from each other in a case where the characters were visually confirmed from a place separated by 0.5 µm.

Examples 2, 3, 6, and 7

The same operation as in Example 1 was performed except that the specific heating and drying condition for the pretreatment liquid as the condition A was changed as listed in Table 2.

The results are listed in Table 2.

Examples 4 and 5

The same operation as in Example 3 was performed except that the kind of the aggregating agent in the pretreatment liquid was changed as listed in Table 2.

The results are listed in Table 2.

Details of the aggregating agents in Examples 4 and 5 are as follows.

$CaCl_2$ . . . calcium chloride (polyvalent metal salt), manufactured by FUJIFILM Wako Pure Chemical Corporation Cationic polymer A . . . poly-2-hydroxypropyldimethylammonium chloride (CATIOMASTER (registered trademark) PD-7 (manufactured by Yokkaichi Chemical Co., Ltd.)

Example 8

The same operation as in Example 3 was performed except that the resin particles were not used in the preparation of the pretreatment liquid.

The results are listed in Table 2.

Example 9

The same operation as in Example 3 was performed except that a corona treatment was performed on the surface of the impermeable base material, onto which the treatment liquid was applied, under a condition of a discharge amount (=discharge power/(discharge electrode length×transport speed of impermeable base material)) of 2 kW/(m×(m/min)) or less on the upstream side of the pretreatment liquid applying device A1 in the transport direction.

The results are listed in Table 2.

In Example 9, the impermeable base material that had been subjected to only the corona treatment under the above-described condition was separately produced, and the surface energy of the surface of the impermeable base material, on which the corona treatment had been performed, was measured. The surface energy of the impermeable base material was determined to be less than 50 mN/m based on the obtained measured value (see Table 2), and the heating and drying condition for the pretreatment liquid was decided as the "condition A".

The specific value of the mass ratio of the pretreatment liquid [after being dried/before being dried] and the specific heating and drying condition as the condition A are respectively as listed in Table 2.

Example 10

The same operation as in Example 3 was performed except that the kind of the impermeable base material was changed to a polyethylene base material ("LL-RP2", manufactured by Futamura Chemical Co., Ltd., thickness of 30 µm) (hereinafter, also referred to as "PE").

The results are listed in Table 2.

In Example 10, the surface energy of the impermeable base material was determined to be less than 50 mN/m based on the measured value of the surface energy of the impermeable base material (see Table 2), and the heating and drying condition for the pretreatment liquid was decided as the "condition A".

The specific value of the mass ratio of the pretreatment liquid [after being dried/before being dried] and the specific heating and drying condition as the condition A are respectively as listed in Table 2.

Example 11

The same operation as in Example 1 was performed except that the kind of the impermeable base material was changed to a polyethylene terephthalate base material ("FE2001", manufactured by Futamura Chemical Co., Ltd., thickness of 25 µm) (hereinafter, also referred to as "PET") and the following points were changed.

The results are listed in Table 2.

In Example 11, since the surface energy of the impermeable base material was 55 mN/m, the surface energy of the impermeable base material was determined to be 50 mN/m or greater.

Therefore, the heating and drying condition for the pretreatment liquid was decided as the "condition B" in which the mass ratio of the pretreatment liquid [after being dried/before being dried] was less than 50%.

The specific value of the of the mass ratio of the pretreatment liquid [after being dried/before being dried] is as listed in Table 2.

In Example 11, the heating and drying condition of the pretreatment liquid in the pretreatment liquid drying zone Dry1 as the condition B was set to the following specific condition. The pretreatment liquid was heated and dried by the pretreatment liquid drying zone Dry1 under the set heating and drying condition.

—Specific Heating and Drying Condition as Condition B—

Drying temperature: 60° C.

Drying time: 6 seconds

Examples 12, 15, 16, and 17

The same operation as in Example 11 was performed except that the specific heating and drying condition of the pretreatment liquid as the condition B was changed as listed in Table 2.

The results are listed in Table 2.

Examples 13 and 14

The same operation as in Example 12 was performed except that the kind of the aggregating agent in the pretreatment liquid was changed as listed in Table 2.

The results are listed in Table 2.

The aggregating agents ($CaCl_2$ and cationic polymer A) in Examples 13 and 14 are respectively the same as the aggregating agents in Examples 4 and 5.

Example 18

The same operation as in Example 12 was performed except that the resin particles were not used in the preparation of the pretreatment liquid.

The results are listed in Table 2.

Example 19

The same operation as in Example 12 was performed except that the corona treatment was performed on the surface of the impermeable base material, onto which the treatment liquid was applied, on the upstream side of the pretreatment liquid applying device A1 in the transport direction.

The results are listed in Table 2.

The condition for the corona treatment in Example 19 is the same as the condition for the corona treatment in Example 9.

In Example 19, the impermeable base material that had been subjected to only the corona treatment under the above-described condition was separately produced, and the surface energy of the surface of the impermeable base material, on which the corona treatment had been performed, was measured. The surface energy of the impermeable base material was determined to be 50 mN/m or greater based on the obtained measured value (see Table 2), and the heating and drying condition for the pretreatment liquid was decided as the "condition B".

The specific value of the mass ratio of the pretreatment liquid [after being dried/before being dried] and the specific heating and drying condition as the condition B are respectively as listed in Table 2.

Example 20

The same operation as in Example 12 was performed except that the kind of the impermeable base material was changed to a nylon base material ("EMBLEM ON-25", manufactured by Unitika Ltd., thickness of 25 μm) (hereinafter, also referred to as "NY").

The results are listed in Table 2.

In Example 20, the surface energy of the impermeable base material was determined to be 50 mN/m or greater based on the measured value of the surface energy of the impermeable base material (see Table 2), and the heating and drying condition for the pretreatment liquid was decided as the "condition B".

The specific value of the mass ratio of the pretreatment liquid [after being dried/before being dried] and the specific heating and drying condition as the condition B are respectively as listed in Table 2.

Comparative Examples 1 to 3

The specific heating and drying conditions for the pretreatment liquid are as listed in Table 2. The same operation as in Example 1 was performed except that the specific heating and drying conditions were changed to the condition B.

The results are listed in Table 2.

Comparative Examples 4 to 6

The specific heating and drying conditions for the pretreatment liquid are as listed in Table 2. The same operation as in Example 11 was performed except that the specific heating and drying conditions were changed to the condition A.

The results are listed in Table 2.

TABLE 2

| | Impermeable base material | | | | Pretreatment liquid | | | | | Pretreatment liquid heating and drying step | | | | | Evaluation items | | |
|---|---|---|---|---|---|---|---|---|---|---|---|---|---|---|---|---|---|
| | | Surface energy | | | Aggregating agent | | Resin | | | | | Amount of pretreatment liquid before being dried | Amount of pretreatment liquid after being dried | Ratio of mass of pretreatment liquid (after being dried/before being dried) | | | |
| | Type | Corona treatment | Numerical value (mN/m) | Less than 50 mN/m? | Type | Amount (%) | Type | Amount (%) | Condition | Drying temperature (°C.) | Drying time (s) | (g/m²) | (g/m²) | | Streaks | Bleeding | Adhesiveness |
| Example 1 | OPP | Not performed | 40 | Y | Glutaric acid | 4 | AE1 | 8 | A | 30° C. | 3 | 1.8 | 1.7 | 95% | 5 | 4 | A |
| Example 2 | OPP | Not performed | 40 | Y | Glutaric acid | 4 | AE1 | 8 | A | 50° C. | 1 | 1.8 | 1.4 | 78% | 5 | 5 | A |
| Example 3 | OPP | Not performed | 40 | Y | Glutaric acid | 4 | AE1 | 8 | A | 50° C. | 2 | 1.8 | 1.1 | 61% | 5 | 5 | A |
| Example 4 | OPP | Not performed | 40 | Y | CaCl₂ | 4 | AE1 | 8 | A | 50° C. | 2 | 1.8 | 1.1 | 61% | 5 | 4 | A |
| Example 5 | OPP | Not performed | 40 | Y | Cationic polymer A | 4 | AE1 | 8 | A | 50° C. | 2 | 1.8 | 1.1 | 61% | 5 | 4 | A |
| Example 6 | OPP | Not performed | 40 | Y | Glutaric acid | 4 | AE1 | 8 | A | 50° C. | 4 | 1.8 | 0.72 | 40% | 5 | 5 | A |
| Example 7 | OPP | Not performed | 40 | Y | Glutaric acid | 4 | — | — | A | 50° C. | 5 | 1.8 | 0.6 | 33% | 3 | 5 | A |
| Example 8 | OPP | Not performed | 40 | Y | — | — | AE1 | 8 | A | 50° C. | 2 | 1.8 | 1.1 | 61% | 5 | 5 | B |
| Example 9 | OPP | Performed | 47 | Y | Glutaric acid | 4 | AE1 | 8 | A | 50° C. | 2 | 1.8 | 1.1 | 61% | 5 | 5 | A |
| Example 10 | PE | Not performed | 46 | Y | Glutaric acid | 4 | AE1 | 8 | A | 50° C. | 2 | 1.8 | 1.1 | 61% | 4 | 5 | A |
| Example 11 | PET | Not performed | 55 | N | Glutaric acid | 4 | AE1 | 8 | B | 60° C. | 6 | 1.8 | 0.2 | 11% | 5 | 5 | A |
| Example 12 | PET | Not performed | 55 | N | Glutaric acid | 4 | AE1 | 8 | B | 60° C. | 5 | 1.8 | 0.3 | 17% | 5 | 5 | A |
| Example 13 | PET | Not performed | 55 | N | CaCl₂ | 2 | AE1 | 8 | B | 60° C. | 5 | 1.8 | 0.3 | 17% | 5 | 4 | A |
| Example 14 | PET | Not performed | 55 | N | Cationic polymer A | 4 | AE1 | 8 | B | 60° C. | 5 | 1.8 | 0.3 | 17% | 5 | 4 | A |
| Example 15 | PET | Not performed | 55 | N | Glutaric acid | 4 | AE1 | 8 | B | 50° C. | 5 | 1.8 | 0.6 | 33% | 5 | 5 | A |
| Example 16 | PET | Not performed | 55 | N | Glutaric acid | 4 | AE1 | 8 | B | 50° C. | 4 | 1.8 | 0.72 | 40% | 5 | 4 | A |
| Example 17 | PET | Not performed | 55 | N | Glutaric acid | 4 | AE1 | 8 | B | 50° C. | 3 | 1.8 | 0.9 | 47% | 5 | 3 | A |
| Example 18 | PET | Not performed | 55 | N | Glutaric acid | 4 | — | — | B | 60° C. | 5 | 1.8 | 0.3 | 17% | 5 | 5 | B |
| Example 19 | PET | Performed | 58 | N | Glutaric acid | 4 | AE1 | 8 | B | 60° C. | 5 | 1.8 | 0.3 | 17% | 5 | 5 | A |
| Example 20 | NY | Not performed | 58 | N | Glutaric acid | 4 | AE1 | 8 | B | 60° C. | 5 | 1.8 | 0.3 | 17% | 5 | 5 | B |

TABLE 2-continued

| | | Impermeable base material | | | | Pretreatment liquid | | | | | Pretreatment liquid heating and drying step | | | | | Evaluation items | | |
|---|---|---|---|---|---|---|---|---|---|---|---|---|---|---|---|---|---|---|
| | | Surface energy | | | | Aggregating agent | | Resin | | | Drying temperature (° C.) | Drying time (s) | Amount of pretreatment liquid before being dried (g/m²) | Amount of pretreatment liquid after being dried (g/m²) | Ratio of mass pretreatment liquid (after being dried/before being dried) | | | |
| | Type | Corona treatment | Numerical value (mN/m) | Less than 50 mN/m? | Type | Amount (%) | Type | Amount (%) | Condition | | | | | | Streaks | Bleeding | Adhesiveness |
| Comparative Example 1 | OPP | Not performed | 40 | Y | Glutaric acid | 4 | AE1 | 8 | B | 60° C. | 6 | 1.8 | 0.2 | 11% | 1 | 5 | A |
| Comparative Example 2 | OPP | Not performed | 40 | Y | Glutaric acid | 4 | AE1 | 8 | B | 60° C. | 5 | 1.8 | 0.3 | 17% | 1 | 5 | A |
| Comparative Example 3 | OPP | Not performed | 40 | Y | Glutaric acid | 4 | AE1 | 8 | B | 50° C. | 6 | 1.8 | 0.5 | 28% | 2 | 5 | A |
| Comparative Example 4 | PET | Not performed | 55 | N | Glutaric acid | 4 | AE1 | 8 | A | 40° C. | 1 | 1.8 | 1.6 | 89% | 5 | 1 | A |
| Comparative Example 5 | PET | Not performed | 55 | N | Glutaric acid | 4 | AE1 | 8 | A | 40° C. | 2 | 1.8 | 1.3 | 72% | 5 | 1 | A |
| Comparative Example 6 | PET | Not performed | 55 | N | Glutaric acid | 4 | AE1 | 8 | A | 40° C. | 3 | 1.8 | 1.0 | 56% | 5 | 2 | A |

As listed in Table 2, in Examples 1 to 10 in which the surface energy of the impermeable base material was less than 50 mN/m and the pretreatment liquid was heated and dried under the condition A in which the mass ratio of the pretreatment liquid [after being dried/before being dried] was 30% or greater and Examples 11 to 20 in which the surface energy of the impermeable base material was 50 mN/m or greater and the pretreatment liquid was heated and dried under the condition B in which the mass ratio of the pretreatment liquid [after being dried/before being dried] was less than 50%, streaks of the image and the bleeding of the image were suppressed.

On the contrary, in Comparative Examples 1 to 3 in which the surface energy of the impermeable base material was less than 50 mN/m and the pretreatment liquid was heated and dried under the condition in which the mass ratio of the pretreatment liquid [after being dried/before being dried] was less than 30%, streaks occurred in the image.

Further, in Comparative Examples 4 to 6 in which the surface energy of the impermeable base material was 50 mN/m or greater and the pretreatment liquid was heated and dried under the condition in which the mass ratio of the pretreatment liquid [after being dried/before being dried] was 50% or greater, bleeding of the image occurred.

Based on the comparison between Example 6 and Example 7, it was found that streaks of the image were further suppressed in a case where the mass ratio of the pretreatment liquid [after being dried/before being dried] under the condition A was set to 40% or greater (Example 6).

Based on the comparison between Example 15 and Example 16, it was found that bleeding of the image was further suppressed in a case where the mass ratio of the pretreatment liquid [after being dried/before being dried] under the condition B was set to less than 40% (Example 15).

Based on the comparison between Example 3 and Example 8, it was found that the adhesiveness of the image to the impermeable base material was further improved in a case where the pretreatment liquid contained a resin (Example 3).

Similarly, based on the comparison between Example 12 and Example 18, it was found that the adhesiveness of the image to the impermeable base material was further improved in a case where the pretreatment liquid contained a resin (Example 12).

As described above, the example group using the cyan ink as the ink has been described. However, it goes without saying that the same effects as those of the above-described example group can be obtained even in a case where the cyan ink was changed to an ink other than the cyan ink (for example, magenta ink, yellow ink, or black ink) in the example group or in a case where a multicolor image was recorded using the cyan ink and at least one ink other than the cyan ink.

Further, in the above-described example group, a person made the determination in the determination step and the decision in the decision step using the image recording device that did not comprise the determining unit nor the deciding unit.

However, it goes without saying that the same effects as those of the above-described example group can be obtained even in a case where the determination in the determination step and the decision in the decision step were made by a device using the image recording system comprising the determining unit and the deciding unit.

EXPLANATION OF REFERENCES 11, 12: horizontal line
100: image recording device
200: image recording system
202: determining unit
204: deciding unit
210, 220A, 220B, 230A, 230B, 240A, 240B, 250: step
S1: impermeable base material
W1: unwinding device
A1: pretreatment liquid applying device
Dry1: pretreatment liquid drying zone
IJ1: ink applying device
Dry2: ink drying zone
W2: winding device

What is claimed is:

1. An image recording method comprising:
preparing an impermeable base material;
preparing a pretreatment liquid containing water and an aggregating agent;
preparing an ink containing water and a colorant;
determining whether a surface energy of the impermeable base material is less than 50 mN/m or greater than 50 mN/m;
deciding a heating and drying condition for heating and drying the pretreatment liquid as a condition A in which a percentage of a mass of the pretreatment liquid after being heated and dried to a mass of the pretreatment liquid before being heated and dried is 30% or greater in a case where the surface energy of the impermeable base material is determined to be less than 50 mN/m and deciding a heating and drying condition for heating and drying the pretreatment liquid as a condition B in which a percentage of a mass of the pretreatment liquid after being heated and dried to a mass of the pretreatment liquid before being heated and dried is less than 50% in a case where the surface energy of the impermeable base material is determined to be 50 mN/m or greater;
applying the pretreatment liquid to the impermeable base material;
heating and drying the pretreatment liquid applied to the impermeable base material under the heating and drying condition decided in the deciding; and
applying the ink to at least a part of a surface of the impermeable base material after the heating and drying, onto which the pretreatment liquid has been applied, to record an image.

2. The image recording method according to claim 1, wherein the percentage in the condition A is 40% or greater, and
the percentage in the condition B is less than 40%.

3. The image recording method according to claim 1, wherein the percentage in the condition B is 35% or less.

4. The image recording method according to claim 1, wherein the pretreatment liquid contains a resin.

5. The image recording method according to claim 1, wherein a solid content in the pretreatment liquid is 30% by mass or less.

6. The image recording method according to claim 1, wherein the aggregating agent is at least one selected from the group consisting of an organic acid, a polyvalent metal compound, and a metal complex.

7. The image recording method according to claim 1, wherein the impermeable base material is a resin base material having a long sheet shape.

8. The image recording method according to claim 1, further comprising:
measuring the surface energy of the impermeable base material to obtain a measured value, wherein in the determining, it is determined whether the surface energy of the impermeable base material is less than 50 mN/m or 50 mN/m or greater based on the measured value.

9. An image recording system comprising:
a pretreatment liquid applying unit which applies a pretreatment liquid to an impermeable base material;
a determining unit which determines whether a surface energy of the impermeable base material is less than 50 mN/m or 50 mN/m or greater;
a deciding unit which decides a heating and drying condition for heating and drying the pretreatment liquid;
a heating and drying unit which heats and dries the pretreatment liquid applied to the impermeable base material under the heating and drying condition decided by the deciding unit; and
an ink applying unit which applies the ink to at least a part of a surface of the impermeable base material after the heating and drying, onto which the pretreatment liquid has been applied, to obtain an image,
wherein the deciding unit decides the heating and drying condition as a condition A in which a percentage of a mass of the pretreatment liquid after being heated and dried to a mass of the pretreatment liquid before being heated and dried is 30% or greater in a case where the surface energy of the impermeable base material is determined to be less than 50 mN/m and decides the heating and drying condition as a condition B in which a percentage of a mass of the pretreatment liquid after being heated and dried to a mass of the pretreatment liquid before being heated and dried is less than 50% in a case where the surface energy of the impermeable base material is determined to be 50 mN/m or greater.

10. The image recording system according to claim 9, wherein the percentage in the condition A is 40% or greater, and
the percentage in the condition B is less than 40%.

* * * * *